US009857888B2

(12) United States Patent
Reynolds et al.

(10) Patent No.: US 9,857,888 B2
(45) Date of Patent: Jan. 2, 2018

(54) PAINT YOUR PLACE APPLICATION FOR OPTIMIZING DIGITAL PAINTING OF AN IMAGE

(71) Applicant: Behr Process Corporation, Santa Ana, CA (US)

(72) Inventors: Damien Reynolds, Huntington Beach, CA (US); Douglas Milsom, Tacoma, WA (US); Vincent Giosa, Conshocken, PA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 15/053,852

(22) Filed: Feb. 25, 2016

(65) Prior Publication Data

US 2016/0275702 A1    Sep. 22, 2016

Related U.S. Application Data

(60) Provisional application No. 62/134,250, filed on Mar. 17, 2015.

(51) Int. Cl.

| | |
|---|---|
| G06F 3/0354 | (2013.01) |
| G06F 3/0481 | (2013.01) |
| G06F 3/0482 | (2013.01) |
| G06F 3/0484 | (2013.01) |
| G06T 11/40 | (2006.01) |
| G06K 9/40 | (2006.01) |
| G06K 9/44 | (2006.01) |

(Continued)

(52) U.S. Cl.
CPC ........ *G06F 3/03543* (2013.01); *G06F 3/0482* (2013.01); *G06F 3/04817* (2013.01); *G06F 3/04842* (2013.01); *G06F 3/04845* (2013.01); *G06F 3/04847* (2013.01); *G06T 7/12* (2017.01); *G06T 11/40* (2013.01); *G06F 17/2235* (2013.01); *G06T 2200/24* (2013.01); *G06T 2207/20012* (2013.01); *G06T 2207/20101* (2013.01); *G06T 2207/20104* (2013.01); *G06T 2207/20216* (2013.01)

(58) Field of Classification Search
CPC combination set(s) only.
See application file for complete search history.

(56) References Cited

U.S. PATENT DOCUMENTS

| | | | |
|---|---|---|---|
| 8,957,915 B1 * | 2/2015 | Chalasani | G09G 5/377 345/473 |
| 2006/0078223 A1 | 4/2006 | Edwards et al. | |

(Continued)

OTHER PUBLICATIONS

European Search Report and Written Opinion regarding Cypriot Application No. CY160002, dated Jan. 12, 2017.

*Primary Examiner* — Wesner Sajous
(74) *Attorney, Agent, or Firm* — Harness, Dickey & Pierce, P.L.C.

(57) ABSTRACT

A user-facing front end screen display of an illustrative digital image painting application includes a bucket tool which enables a user to apply a selected color to a selected area of an uploaded digital image such as a wall of a room, a paint brush tool to fill in missed areas, an eraser tool is to remove misapplied color, masking tools to mask off selected areas, and a tolerance slider tool to assist in properly filling in painted areas. Improved image preprocessing methods enable better definition of areas of the image to be painted the same color.

14 Claims, 36 Drawing Sheets

(51) Int. Cl.
*G09G 5/02* (2006.01)
*G09G 5/06* (2006.01)
*G06T 7/12* (2017.01)
*G06F 17/22* (2006.01)

(56) References Cited

U.S. PATENT DOCUMENTS

| | | |
|---|---|---|
| 2008/0292218 A1* | 11/2008 | Anderson ............. G06T 11/001 382/311 |
| 2012/0206479 A1 | 8/2012 | Bryant et al. |
| 2014/0040789 A1 | 2/2014 | Munter et al. |
| 2014/0267364 A1 | 9/2014 | Lapinski |
| 2015/0154676 A1* | 6/2015 | Matousek .......... G06Q 30/0621 705/26.5 |

* cited by examiner

PAINT YOUR PLACE APPLICATION FOR OPTIMIZING DIGITAL PAINTING OF AN IMAGE

CROSS REFERENCE TO RELATED APPLICATIONS

This application claims the benefit of and priority to U. S. Provisional Patent Application No. 62/134,250, filed Mar. 17, 2015, and entitled, "Paint Your Place Application for Optimizing Digital Painting of an Image," the contents of which is incorporated herein by this reference in its entirety.

FIELD

The subject disclosure relates to automated color selection and coordination systems and more particularly to such a system which enables a user to visualize how a selected color would appear in an uploaded photographic image of a room or other paintable area. The subject disclosure further relates to methods and apparatus for digital painting of such an uploaded image, as well as to methods and apparatus for optimizing such procedures.

RELATED ART

Automated color selection and coordination systems are disclosed, for example, in U.S. Patent Publication No. 2012/0062583, published Mar. 15, 2012, entitled, "Data Driven Color Coordinator," assigned to Behr Process Corporation, Santa Ana, Calif.

SUMMARY

According to an illustrative embodiment, a user-facing front end screen display of an illustrative digital image painting application includes a bucket tool, a paint brush tool, an eraser tool and a masking tool. In an illustrative embodiment, the paint bucket tool enables a user to apply a selected color to a selected area of an uploaded image such as the wall of a room, thereby simulating painting of the room with the selected color and allowing a user to visualize, for example, what the user's own room would look like painted with the selected color. In an illustrative embodiment, the paint brush tool is employed to fill an area which was missed during application of the selected color to the first area, the eraser tool is employed to remove color which bled into an undesired area during application of the selected color, and the masking tool is employed to mask off an area which is not to be painted. In one illustrative embodiment, two masking tools may be employed to apply a straight line mask or a polygonal mask.

In an illustrative embodiment, a tolerance slider tool is also provided to assist in properly filling in painted areas. The tolerance slider tool may enable the user to either increase or decrease the area painted. In one embodiment, the display of the tolerance slider tool comprises a darkened area in a right triangle which may be pulled to the right or left to either increase or decrease the area painted.

Another aspect of the subject disclosure relates to a method of preprocessing an uploaded digital image prior to "painting" the image wherein a bilateral smoothing algorithm is run in order to remove noise from flat surfaces of the image while retaining the integrity of the edges and color differences. Sobel and Canny edge detection algorithms are then run against the image and the image data resulting from running the Canny algorithm is stored separately from the image data resulting from running the Sobel algorithm. A floodfill algorithm is then executed on the Sobel image data to perform segmentation of the image into areas segments having the same color, wherein the floodfill algorithm is modified to account for the natural gradient of the Sobel algorithm, thereby allowing the definition of one or more tolerances for the definition of image edges. If an edge of a segment determined by application of the floodfill algorithm and the Sobel algorithm is close to a Canny edge, the paint color assigned to that segment is pulled to the Canny edge to give sharp edges.

According to one illustrative embodiment, the pixel color of an area identified for segmentation is then averaged over the area as a whole. Then the average pixel color of the area is iterated through previously found segments to determine whether the area has the same or similar average pixel color to previously found segments, and if it does, the area is associated with the previously found color. All associated segments may be averaged out to define a base luminosity for the same color across multiple segments, and a segment under analysis with its overall average color may then be stored for future calculations.

DESCRIPTION OF THE DRAWINGS

FIG. 4 is a second illustrative screen display of a customer facing paint selection and coordination system of an illustrative embodiment;

FIG. 5 is a third illustrative screen display of a customer facing paint selection and coordination system of an illustrative embodiment;

DETAILED DESCRIPTION

Figure 1:
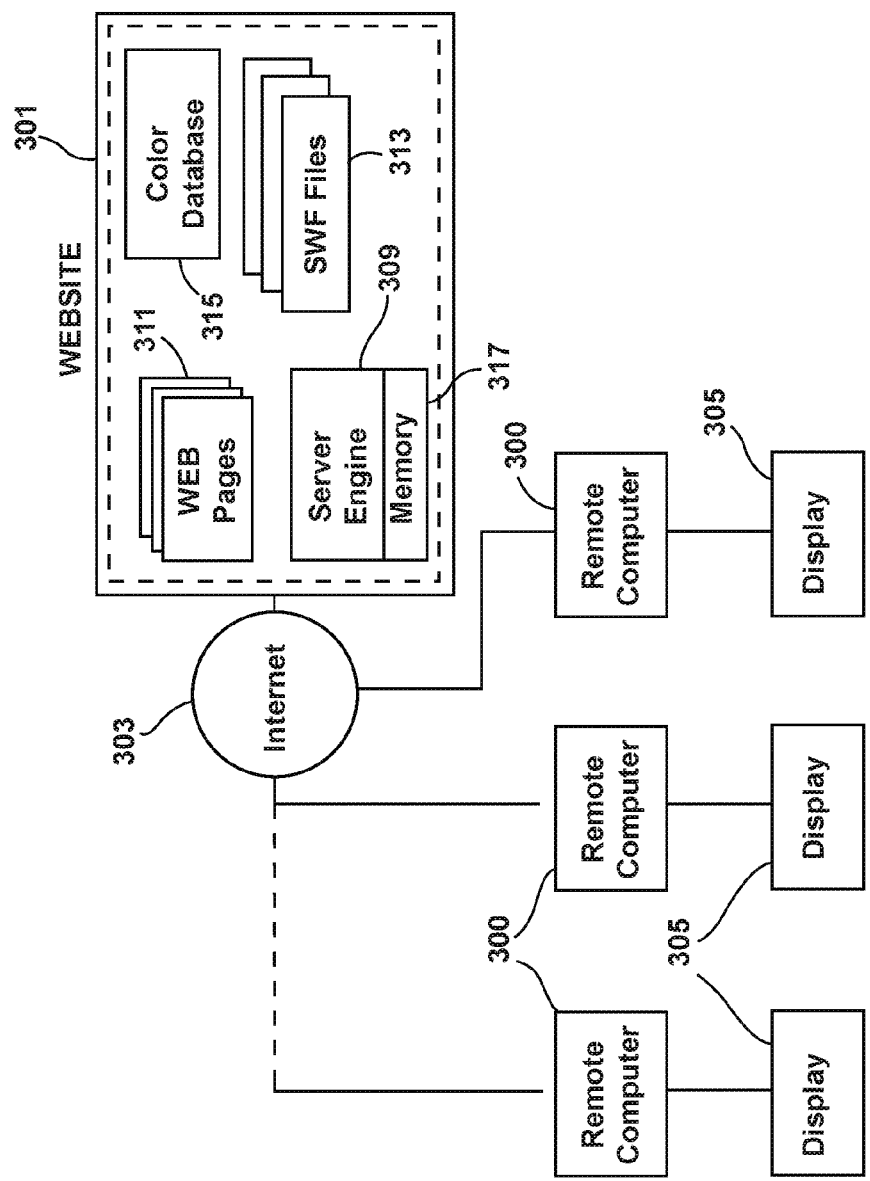
FIG. 1 is a block diagram of an illustrative system for implementing a paint your place application according to an illustrative embodiment.

FIG. 1 illustrates a block diagram of a system in which multiple remote computers 300 may access a paint color selection and coordination website 301, which in one embodiment may provide or download a Paint Your Place application to end users as described further hereafter. The website 301 may be coupled to the Internet 303 in order to provide access to a large number of remote terminals/computers 300, for example, at in-home end user sites. Each remote computer 300 controls a display apparatus 305, which may comprise, for example, one or more CRTs or flat screen computer monitors or displays.

The website 301 may comprise a server engine 309 comprising one or more computers, or servers, associated memory 317 and server software such as a server operating system and server application programs. In one embodiment, the website 301 is arranged to store and transmit a plurality of related documents or web pages 311 in digital format, for example, such as HTML documents, and further may include a color data base 315 where color data is stored as described, for example, in U.S. Pat. No. 7,999,825, entitled, "Color Selection and Coordination System," incorporated herein by reference in its entirety. It will be appreciated that, in one embodiment, the computer controlled display apparatus transforms the digital format web pages into static and/or animated interactive visual images for an end user. The associated memory 317 may comprise a computer readable digital storage media or medium, such as, for example, hard disc storage.

A user may interact with the website 301 over the Internet 303 or other communication medium or media via selection operations performed on web page display screens presented to the user via the display apparatus 305 of a remote computer 300. Such selection operations may be performed by, for example, a keyboard, mouse, track ball, touch screen or other data entry means. In such a manner, various links presented on the display apparatus 305 may be selected by various point and click, point and touch, or other selection operations.

In various embodiments, remote computers 300 may comprise or form part of a computer terminal, a personal digital assistant (PDA), a wireless telephone, a "smart phone," a laptop, desktop or notebook computer, and/or the like. In various embodiments, the communications medium or media may comprise a local area network (LAN), a wide area network (WAN), a wireless network, an intranet, an internet, and/or the like.

In one embodiment, website functionality may be implemented in software stored on a computer readable storage medium or media and executed by a suitable device, for example, such as one or more digital processors or computers, which may comprise part of a web server or other suitable apparatus. In other embodiments, such software can be located on a personal computer or similar device having a flat panel display or other display device at a user site without involvement of a server or the Internet. In such case, display screens are generated which may have the same content as webpages, such that the terms "webpage," "screen display," "display," and similar terms are used interchangeably herein. Illustrative screens displays and functionality of an illustrative embodiment may be implemented in one or more application programs, which may be written in, for example, HTTP, PHP, MySQL, JavaScript, XMPP Server, Solr Server, LAMP technology stack, Java, Laszlo Presentation Server or C++ and, which may run, for example, on a Windows XP or other operating system. Various display screens and functionality of illustrative embodiments are described below.

Figure 2:
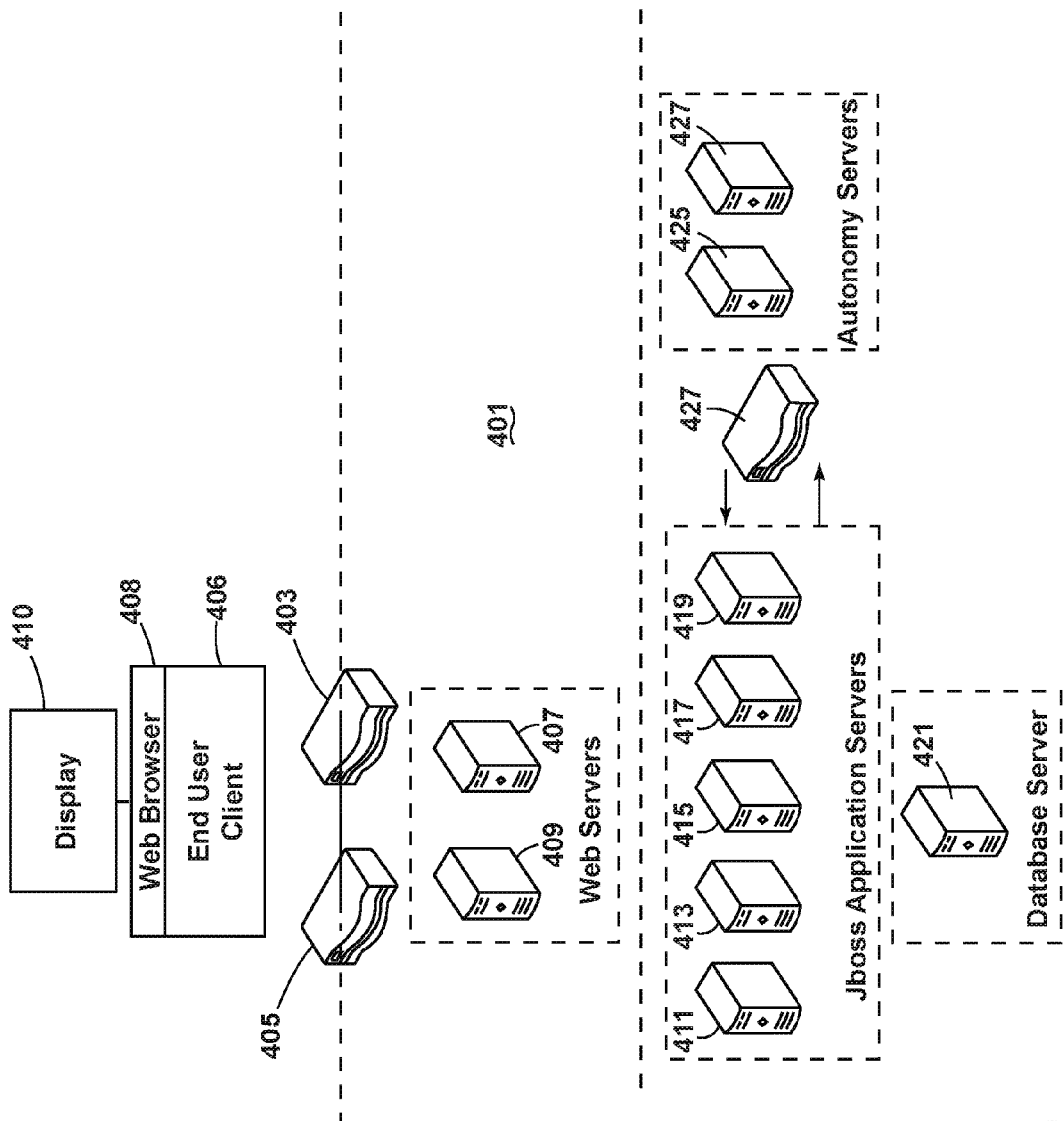
FIG. 2 is a block diagram of an alternate illustrative system for implementing a paint your place application according to an illustrative embodiment.

Another illustrative embodiment of a website 401 for providing content to an end user as described below is shown in FIG. 2. The website 401 employs first and second load balancers 403, 405, which communicate with a pair of web servers 407, 409, for example, such as Apache web servers. The web servers 407, 409 further communicate with five application (Jboss) servers 411, 413, 415, 417, 419, which are arranged to access a database comprising digital storage media and a database server 421. Additionally, the application servers, e.g. 411, may communicate through a load balancer 423 with first and second Autonomy Servers 425, 427.

The operation of the system of FIG. 2 may be illustrated as follows. The end user opens a browser on his computer, e.g. 301, and enters a request to visit http://www.behr.com. That request reaches the two Cisco load balancers 407, 409. One of the load balancers, e.g. 407, passes the request to one of two Apache web servers 407, 409. The Apache web server, e.g. 409, analyzes the request and determines if it can be handled locally, i.e. checks to see if the object exists in the server document root. Any portion of the request that can be fulfilled by the Apache server 409 is typically static content, i.e. .png, .jpg, .swf, .css, .js, .html, .txt, resident in digital storage on the server 409. Any portion of the request that cannot be served by the Apache server 409 is passed back to the Jboss server, e.g. 411, for example, configured context roots, dynamic content, and processing requests such as a log-on event. The application server 411 then processes the portion of the request forwarded to it. If additional data is needed from the database 421, for example, a username, password, or workbook, the application server 411 retrieves that data from the database 421. The application server 411 then sends processed data back out through the webserver 409 to the client residing on the computer 406 of the end user, in this case the web browser 408. The web browser 408 re-assembles the data and renders the page in the browser, which causes display on the display apparatus 410 of the user's computer 406. The servers then wait for next request.

In one embodiment, in response to the user's initial access, a website (client) application is transmitted to the user's computer, e.g. 406, and runs in the browser of the user computer. In one embodiment, the website application is a SWF application which controls flash player animation on the user's display, for example, how various features animate in and out or fade in or out. The actual content of a particular page is pulled dynamically from the server system in response to user selection ("clicking") operations. The web server supplies data comprising the XML code, which defines the active content to be displayed, to the user's flash player along with the static content, e.g. a home page project image in, for example, HTML format.

Thus, for example, when the user selects a home page, the website application accesses the server system, which supplies, for example, a project image, hot spot locations, colors to display in connection with any hot spot functionality, drop down elements (menus) and instructs the SWF application what to build.

Figure 3:
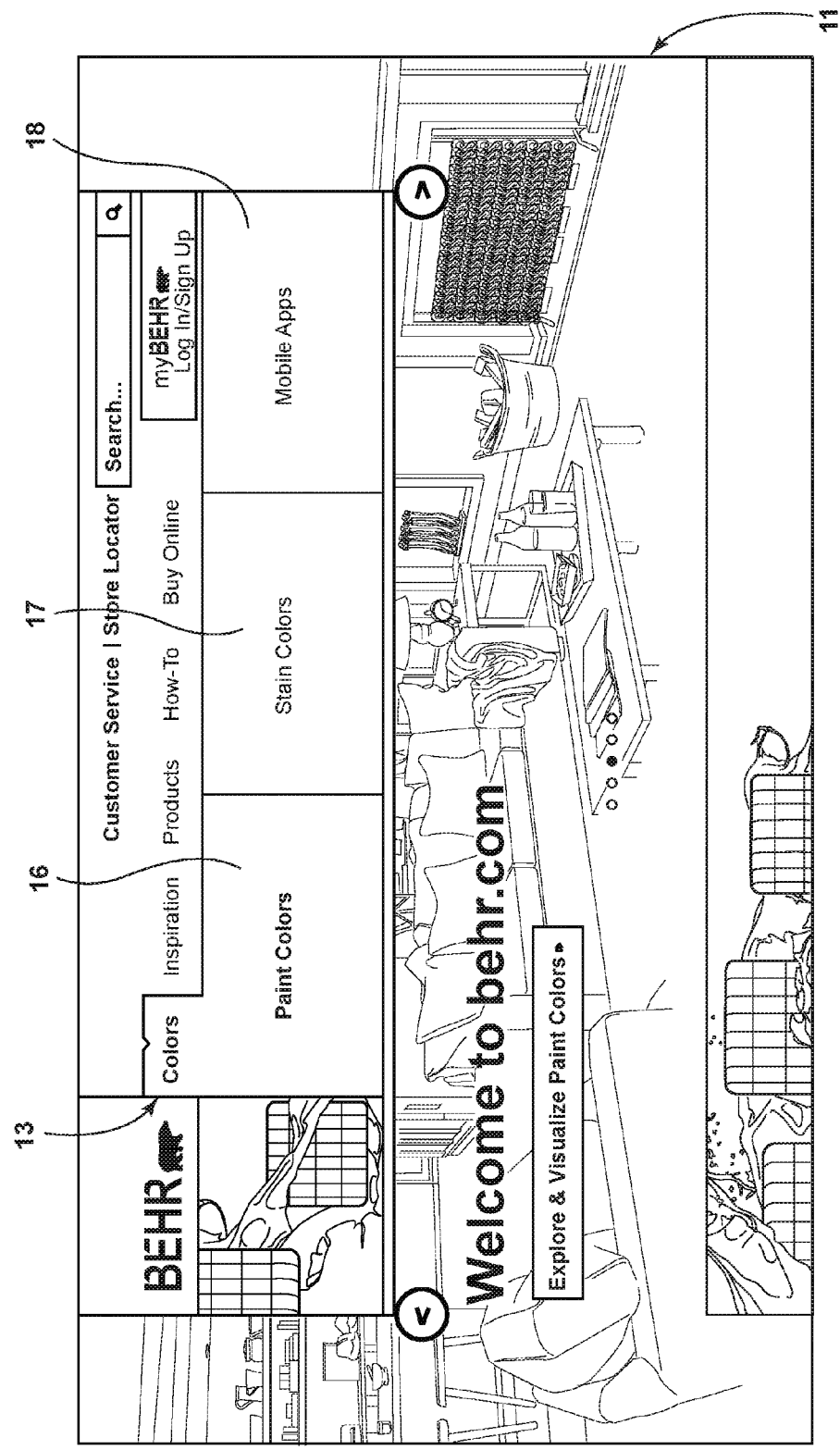
FIG. 3 is an illustrative screen display of a customer facing paint selection and coordination system of an illustrative embodiment.

An illustrative embodiment 11 of a home page for a customer-facing paint color selection and coordination website is shown in FIG. 3. As shown in FIG. 3, a user has selected "Colors" section 13 in the dropdown navigation menu 15 on the web page 11. Selecting the "Colors" link 13 reveals "Paint Colors," "Stain Colors," and "Mobile Apps" links 15, 16, 17, 18.

Figure 4:
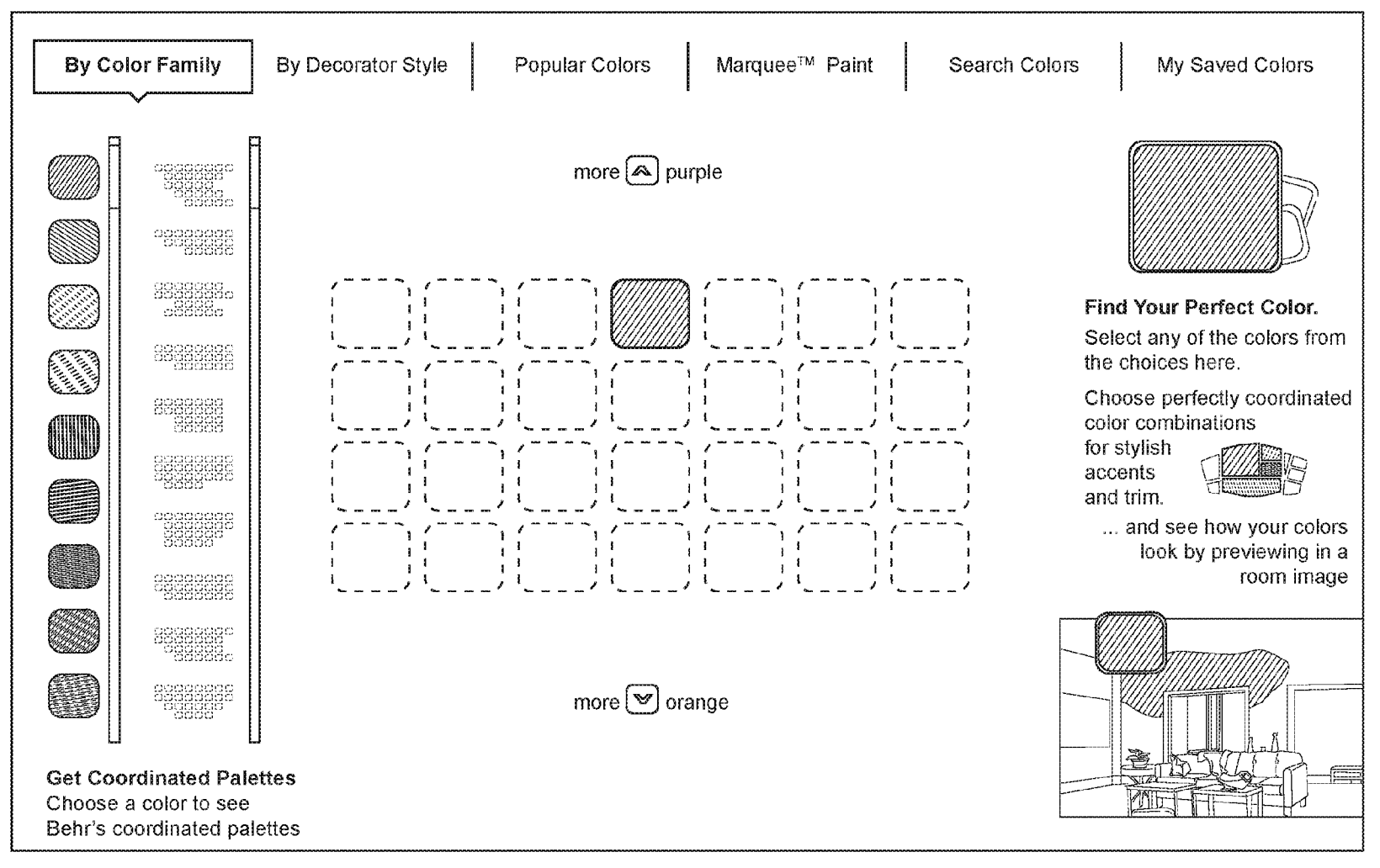

Upon clicking the Paint Colors link 16, the user is brought to the ColorSmart visualizer page FIG. 4, where the user can select a color with which to paint. Further details of the structure and operation of such a page and related pages is disclosed in U.S. Patent Publication 2014/0075361 A1, entitled, "Automated Color Selection Method and Apparatus with Compact Functionality," which is incorporated in its entirety herein by this reference.

Figure 5:
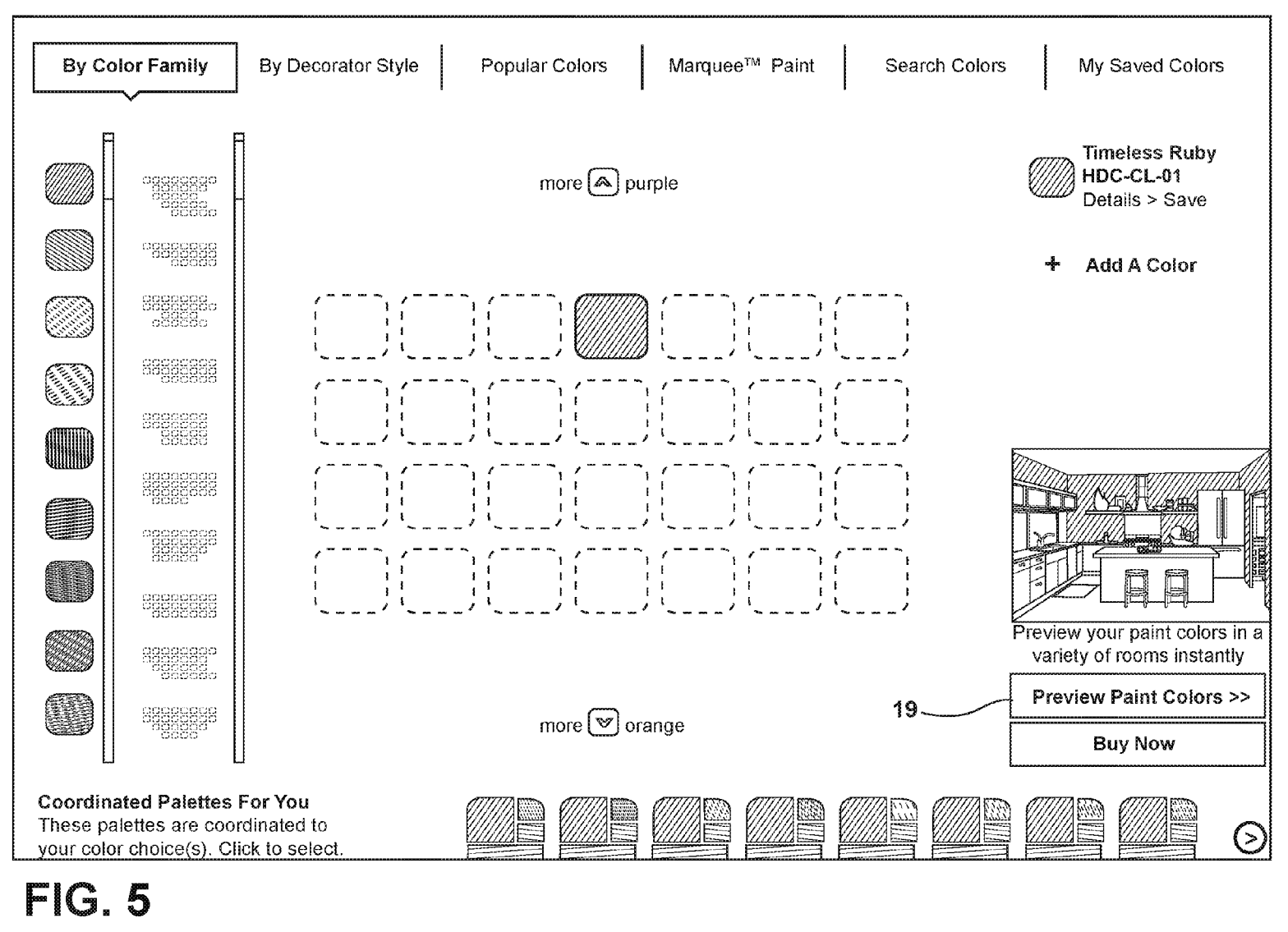
Figure 6:
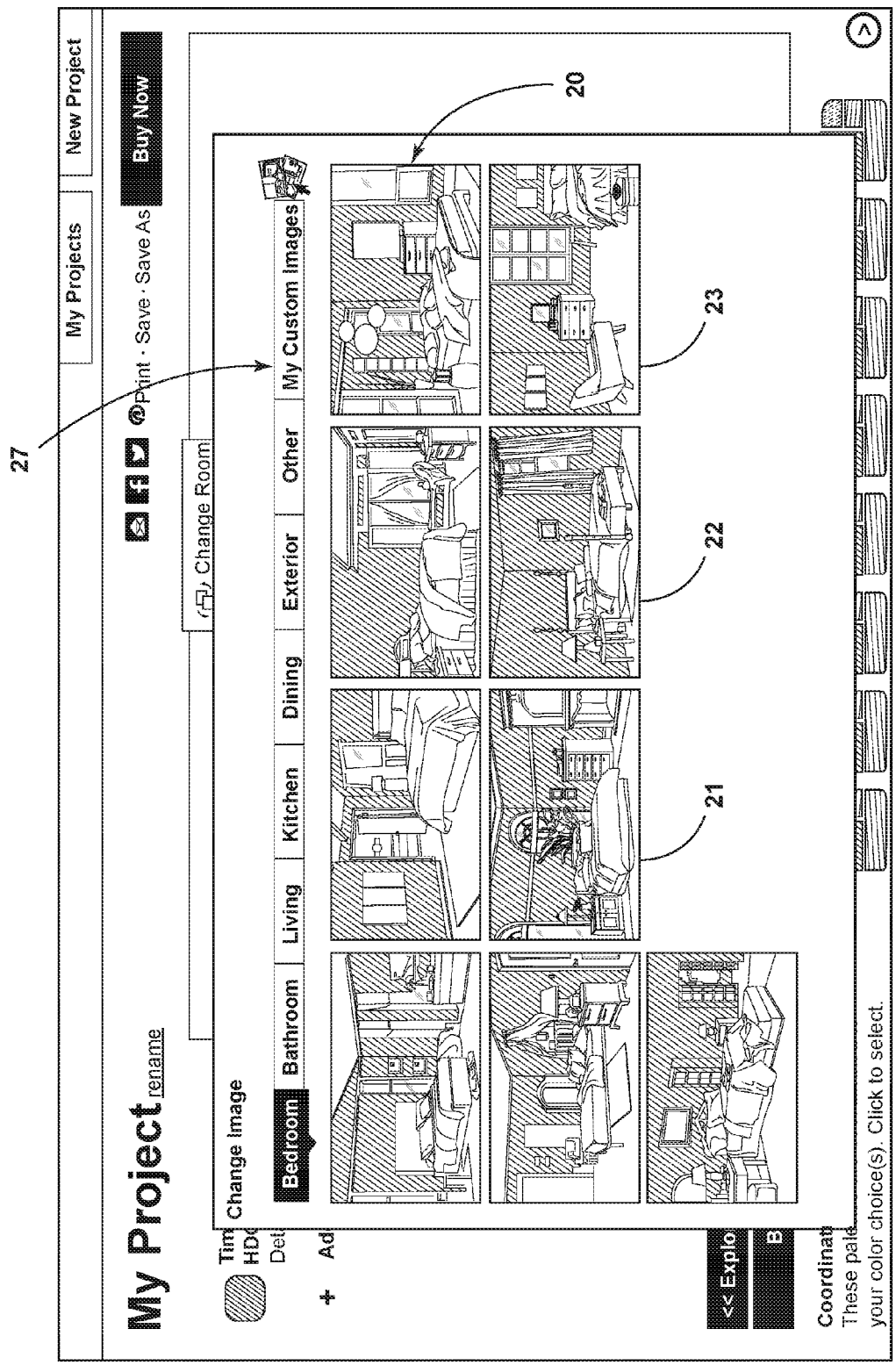
FIG. 6 is a fourth illustrative screen display of a customer facing paint selection and coordination system of an illustrative embodiment.

After the user selects a color, e.g., "Timeless Ruby" on the display of FIG. 4, the user clicks the "preview paint colors" link 19 in the display of FIG. 5. The user is then brought to the screen display of FIG. 6, which provides an overlay 20 which provides the ability to choose from a list of pre-generated rooms, e.g. 21, 22, 23 to which the user may decide to add paint color.

Figure 7:
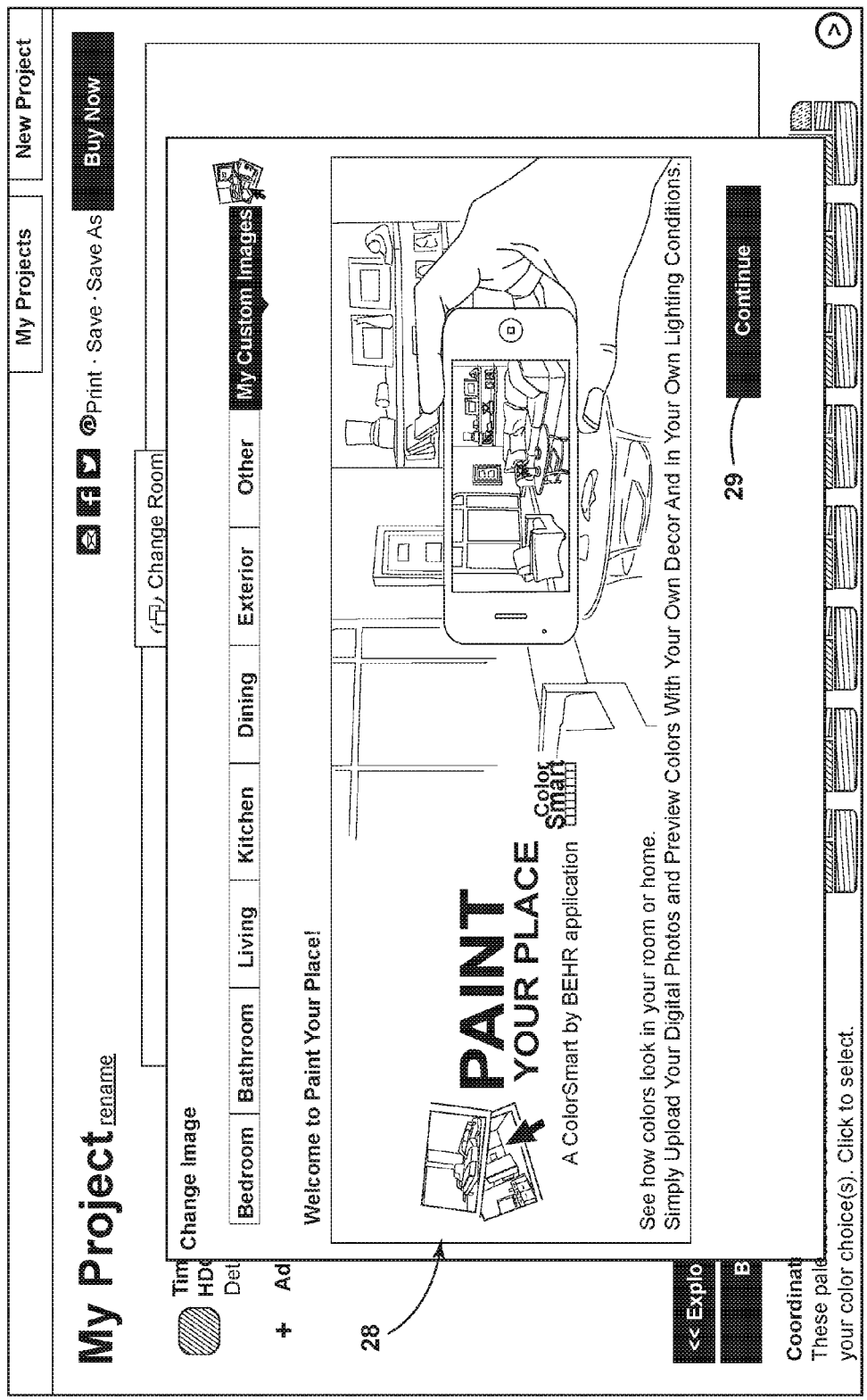
FIG. 7 is a fifth illustrative screen display of a customer facing paint selection and coordination system of an illustrative embodiment.

Next, the user clicks on the "My Custom Images" tab 27 on the top right side of the overlay 20. By clicking the My Custom Images tab 27, the user will see the overlay change to an introduction 28 to the Paint Your Place application shown in FIG. 7. The user then clicks the "continue" link 29 to enter into a Paint Your Place procedure, enabling the user to upload an image, such as an image of a photograph.

Figure 8:
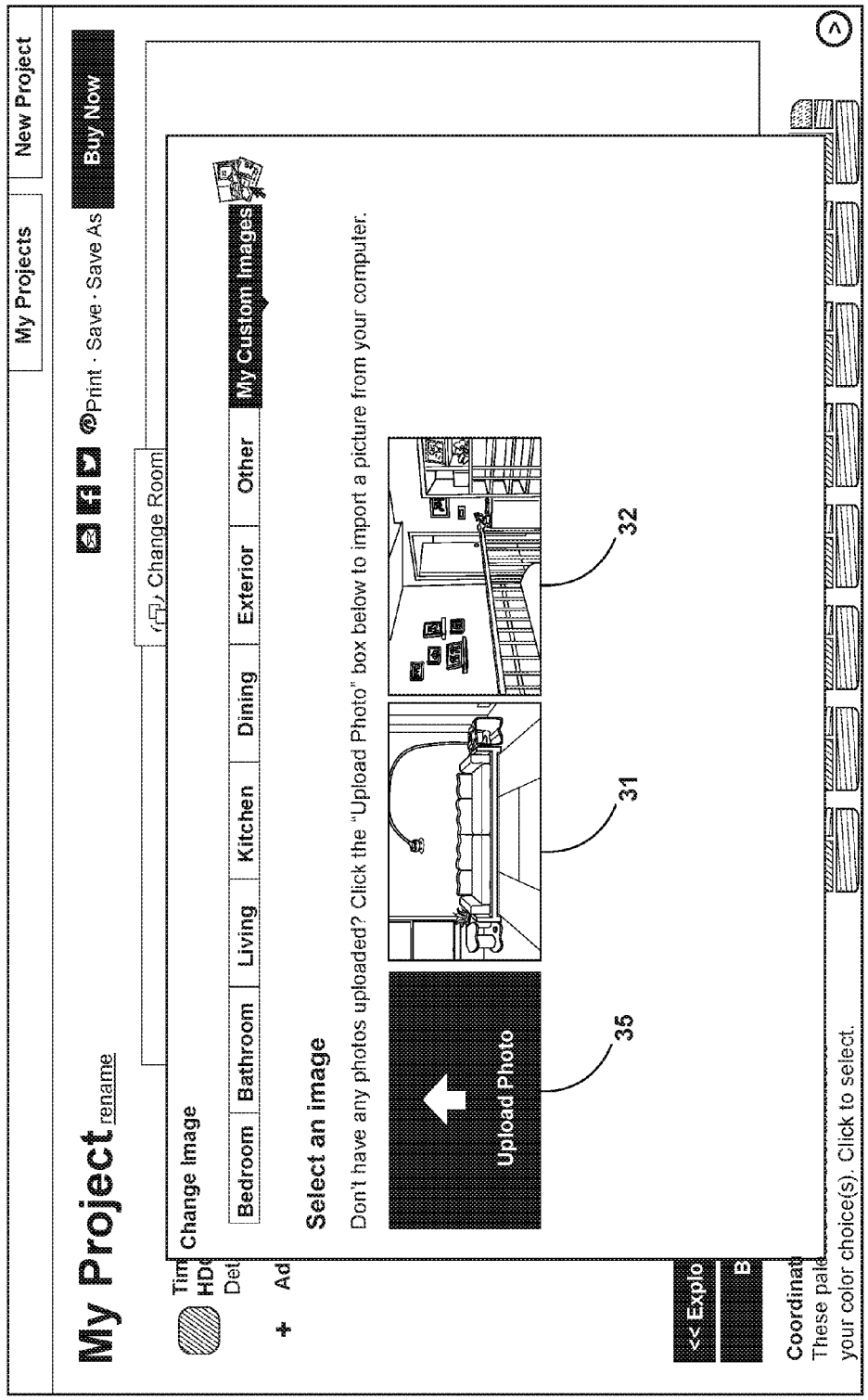
FIG. 8 is a sixth illustrative screen display of a customer facing paint selection and coordination system of an illustrative embodiment.
Figure 9:
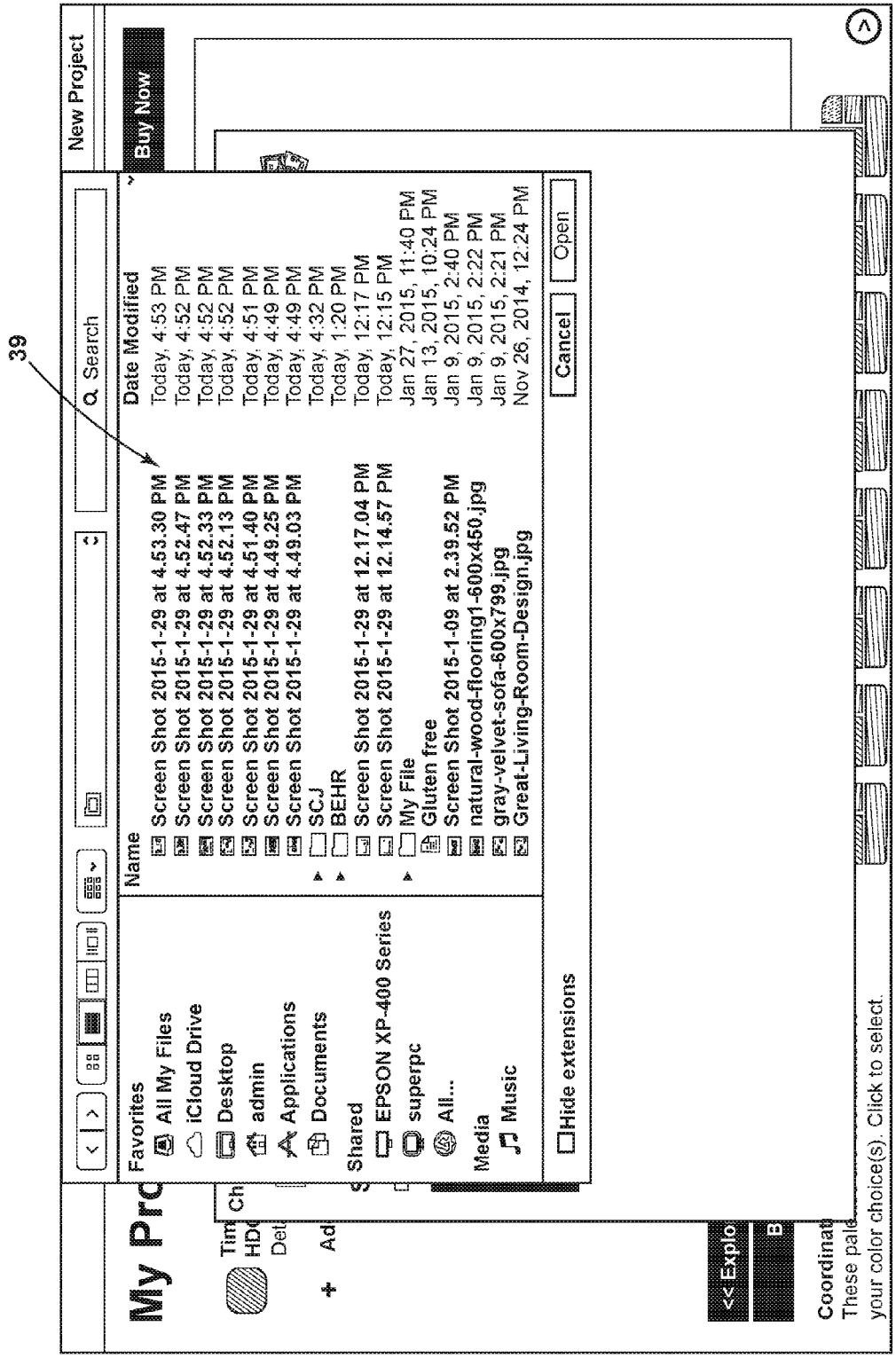
FIG. 9 is a seventh illustrative screen display of a customer facing paint selection and coordination system of an illustrative embodiment.

If the user has uploaded images before, the previously uploaded images will be depicted—see images 31, 32 of FIG. 8. If no images have been uploaded, the user will only see the "upload photo" button 35, which is selected to begin the upload photo procedure. When the use clicks the orange button 35 to upload a photo, an overlay 26 shown in FIG. 9 opens up image files 39 on the user computer enabling the user to choose what image files the user would like to upload by following the procedure of FIG. 10.

Figure 10:
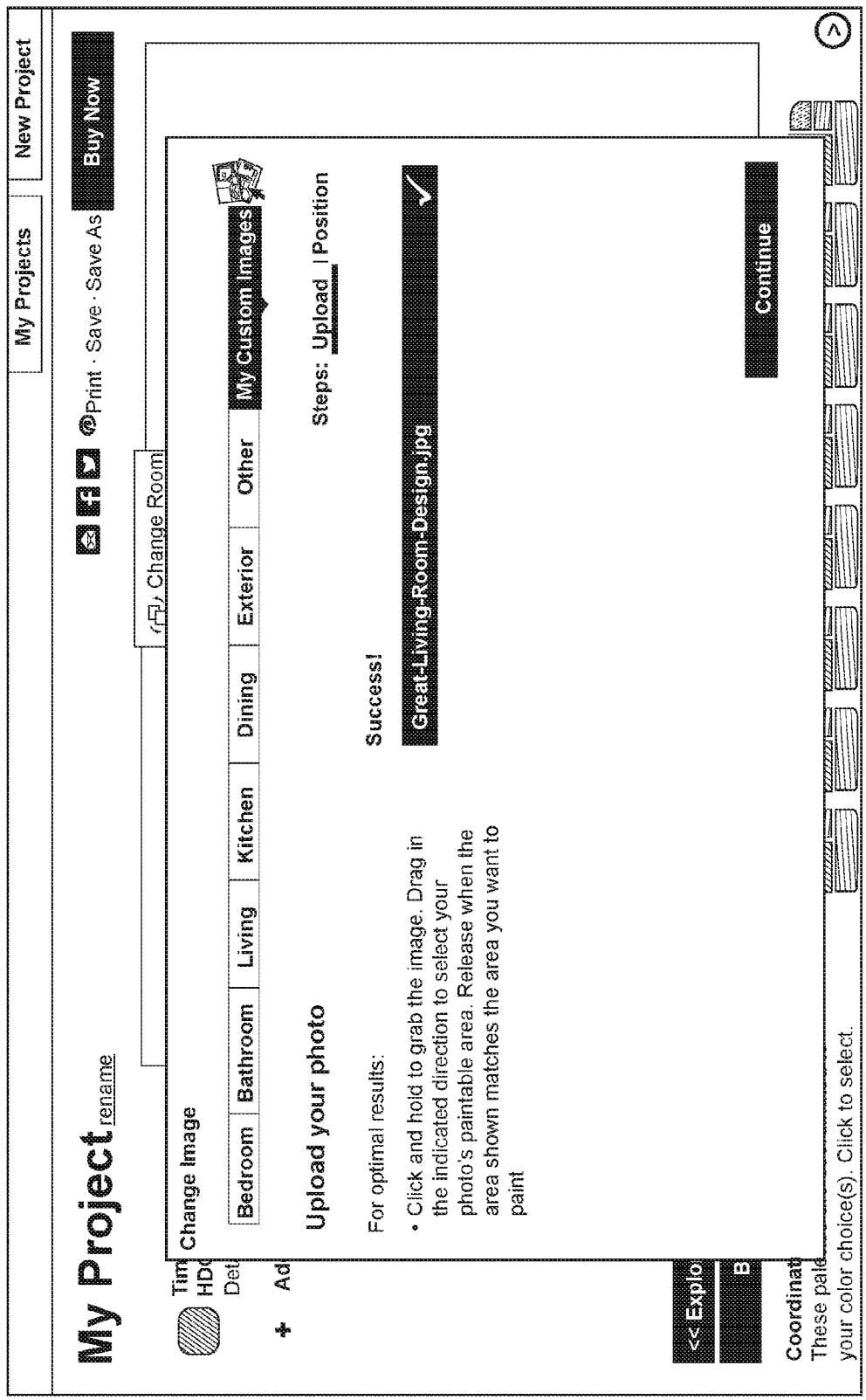
FIG. 10 is a screen display enabling a user to select an image for painting.

After the user has selected an image, the image is then loaded as shown in FIG. 10, for example, by clicking and holding to grab the image and thereafter dragging the image. The screen of FIG. 11 enables the user to make adjustments like shifting the image 39 or rotating it. Once the user has settled on the desired positioning of the uploaded image 39, the user clicks on the "Paint Your Place" button 40 located at the bottom right of the overlay to process and upload the image on to the Paint Your Place application described in further detail below.

Figure 11:
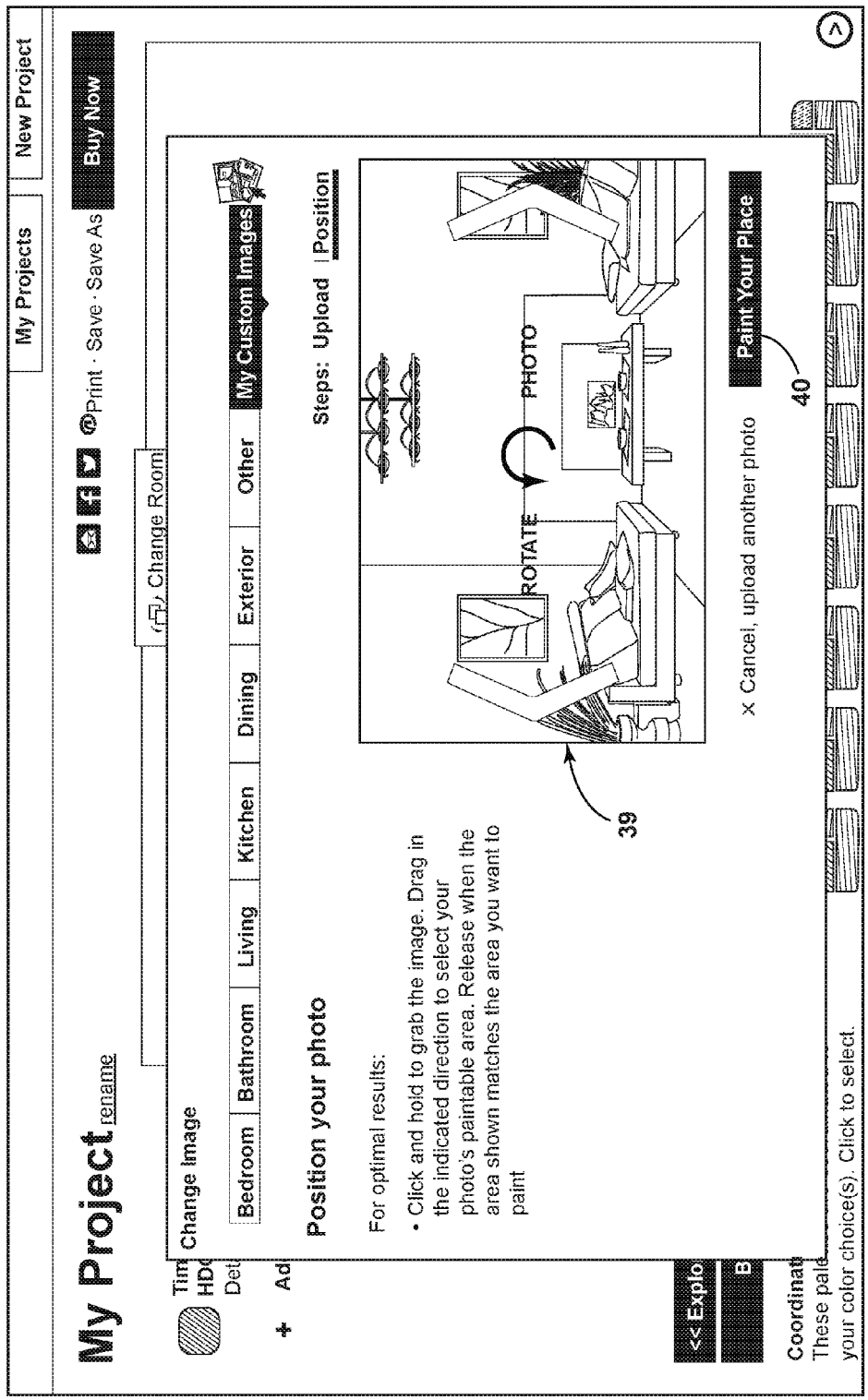
FIG. 11 is a screen display enabling a user to adjust the positioning of a selected image.
Figure 12:
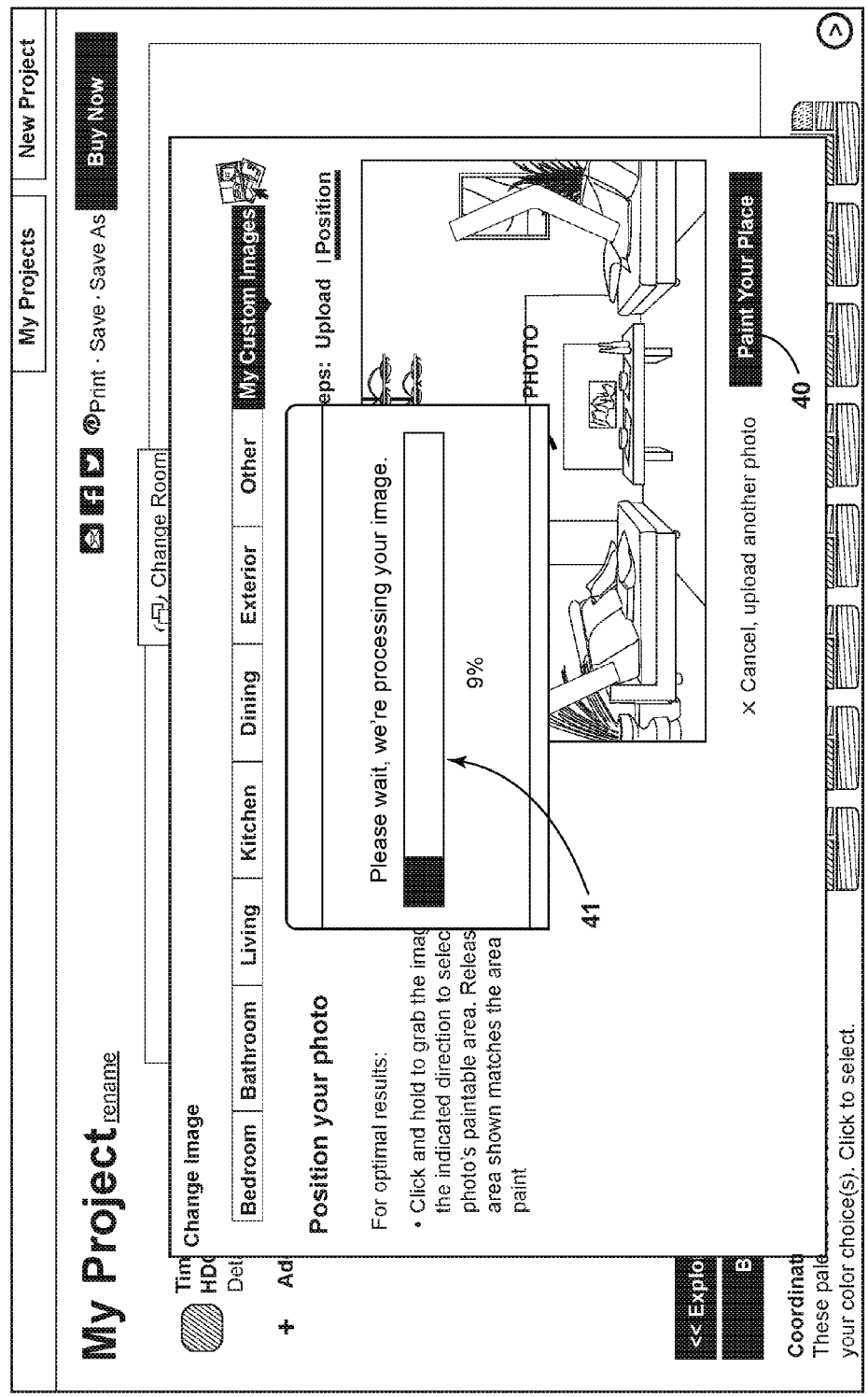
FIG. 12 is a screen display enabling a user to see what percentage a selected image has been uploaded.
Figure 13:
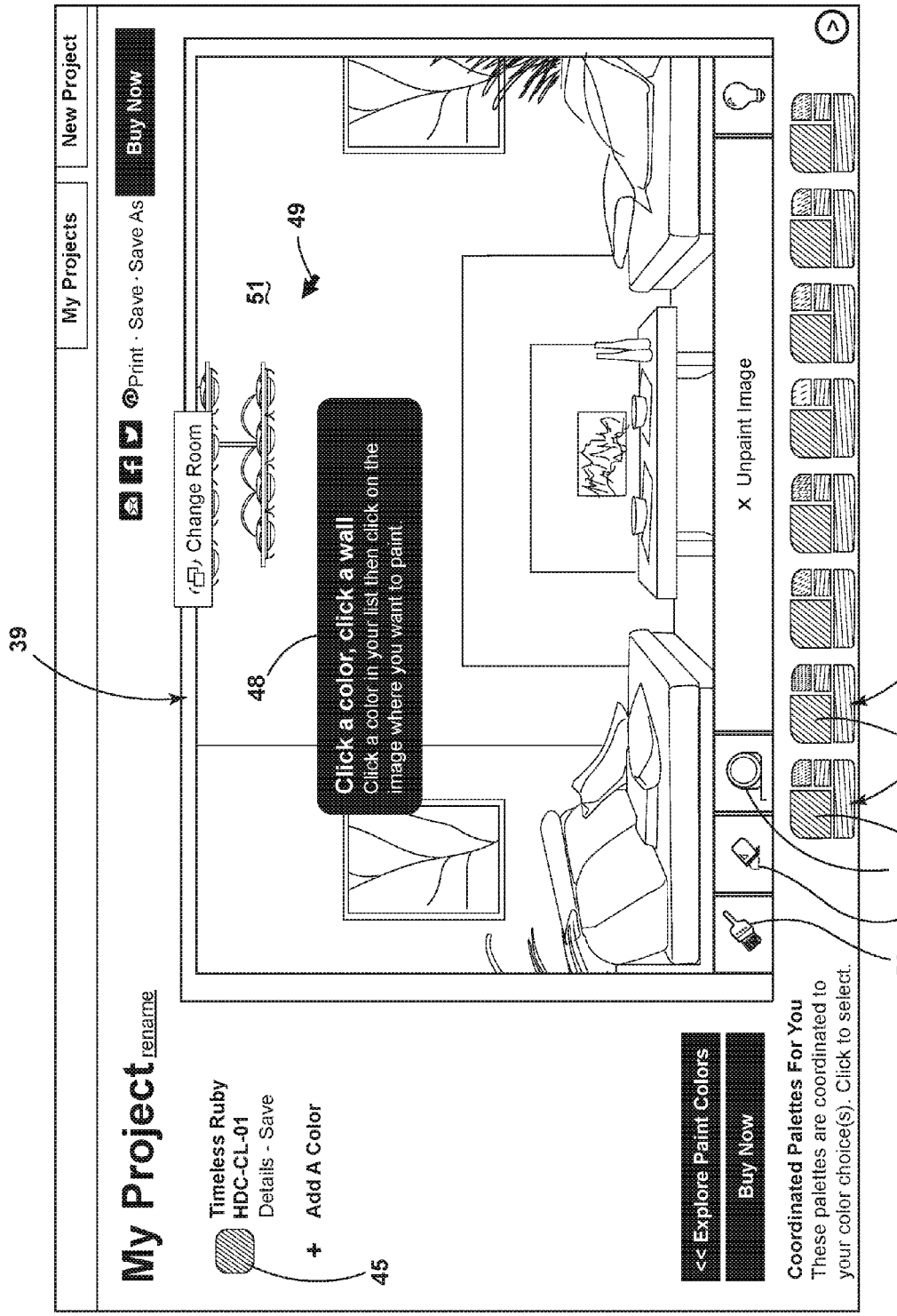
FIG. 13 is a screen display enabling a user to select a paint bucket feature to paint the selected image.
Figure 14:
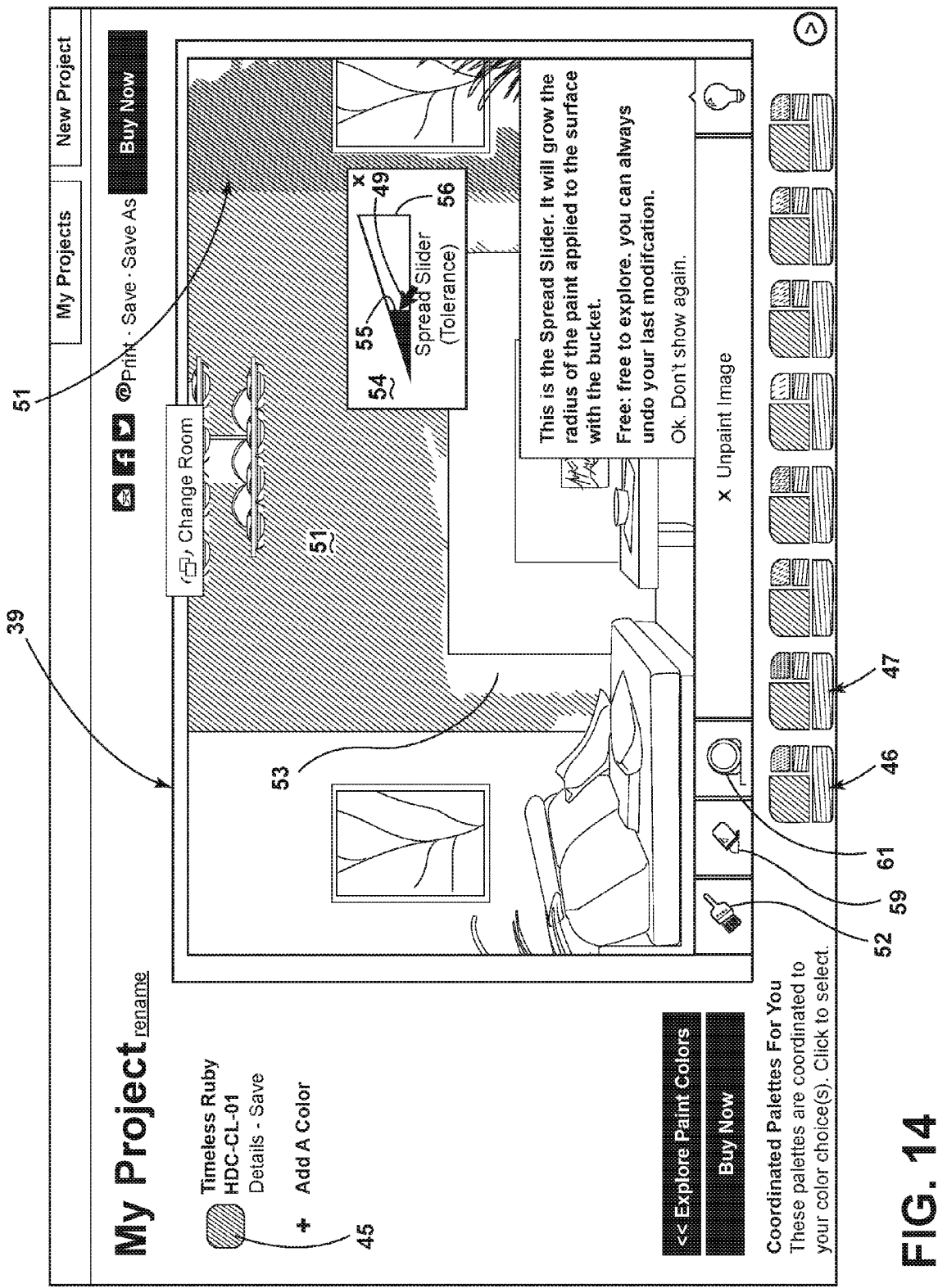
FIG. 14 is a screen display illustrating use of the paint bucket display and associated slider tool.

After clicking the Paint Your Place button 40 in FIG. 11, the user sees a real time loading bar 41, FIG. 12. This bar 41 informs the user of what percent of their image 39 has been processed and uploaded to the Paint Your Place application. When the image 39 finishes being processed, the user is brought to the screen of FIG. 13 showing the user's image 39, the color(s) 45 the user has selected, a number of color palettes, e.g. 46, 47, each palette including the selected color 45 and three different colors which coordinate therewith, and an overlay 48 prompting the user to click a color, then click a wall. The screen of FIG. 14 also includes buttons or icons for selecting a paint brush tool 52, an eraser tool 59, and a masking tool 61. A paint bucket tool is auto-selected upon entering the application, enabling the user to click on a selected wall, e.g. 51, with a mouse-directed cursor 49, and add a selected color, e.g. 45, to the wall 51 in the room image 39 as shown in FIG. 14 where the selected color 45 is indicated by cross-hatching on the wall 51. The user may of course use the bucket tool to add color to other areas or objects in the room depicted in the uploaded image 39

Figure 15:
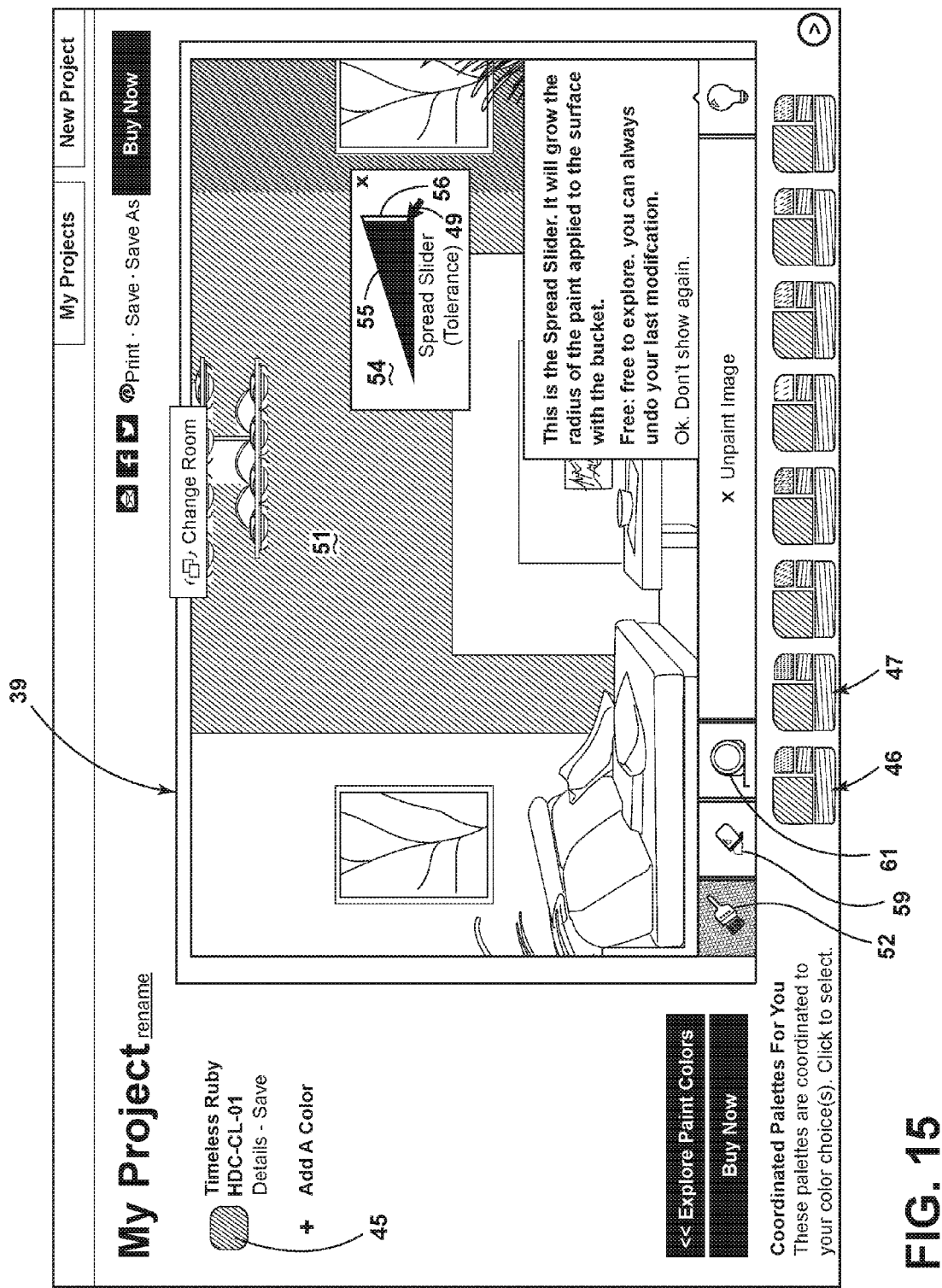
FIG. 15 is another screen display illustrating use of the paint bucket display and associated slider tool.

FIG. 14 also illustrates a Spread Slider Tool 54. The use of the spread slider 54 reduces or increases the amount of paint added to the clicked area and grows the radius of the paint applied to the surface 51, allowing the user to fill in unpainted areas, e.g. 53, as shown in FIGS. 14 and 15. In the embodiment of FIGS. 14 and 15, the mouse cursor pulls the dark area 55 ("slider") to the right within the right triangle 56 to increase the area painted and fill in unpainted areas, for example, such as area 53.

Figure 16:
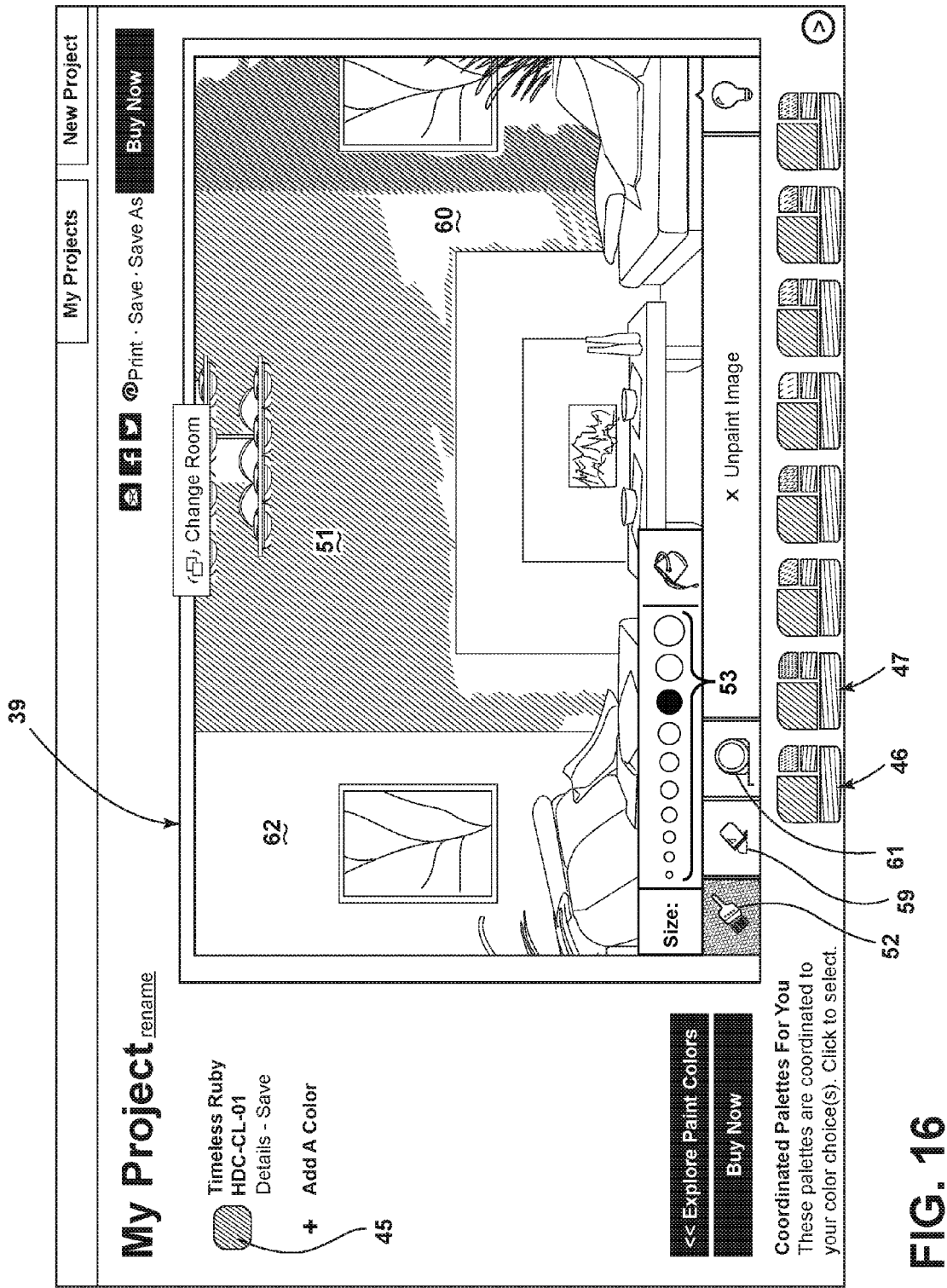
FIG. 16 is a screen display illustrating use of a paint brush tool.
Figure 17:
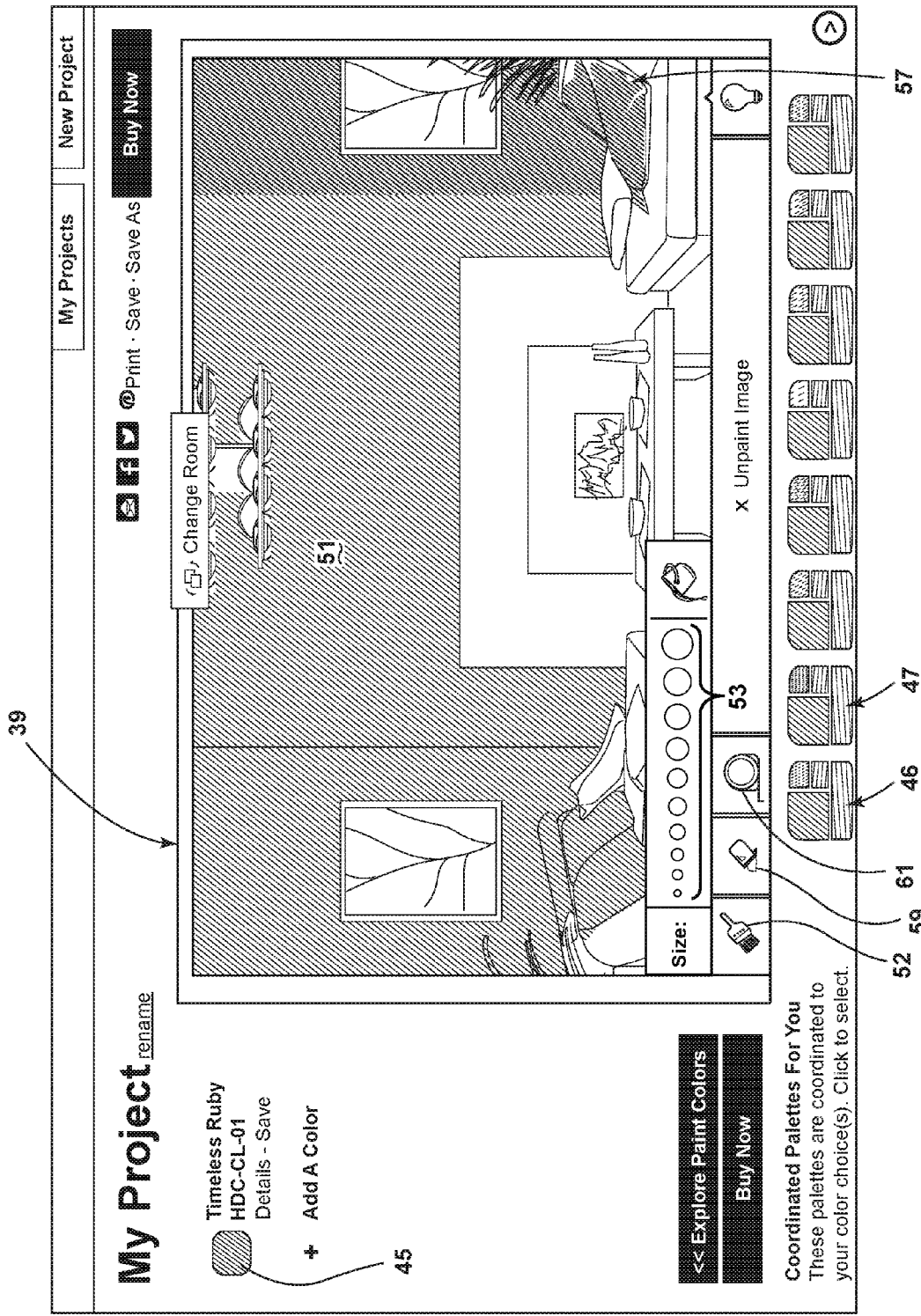
FIG. 17 is another screen display illustrating use of a paint brush tool.
Figure 18:
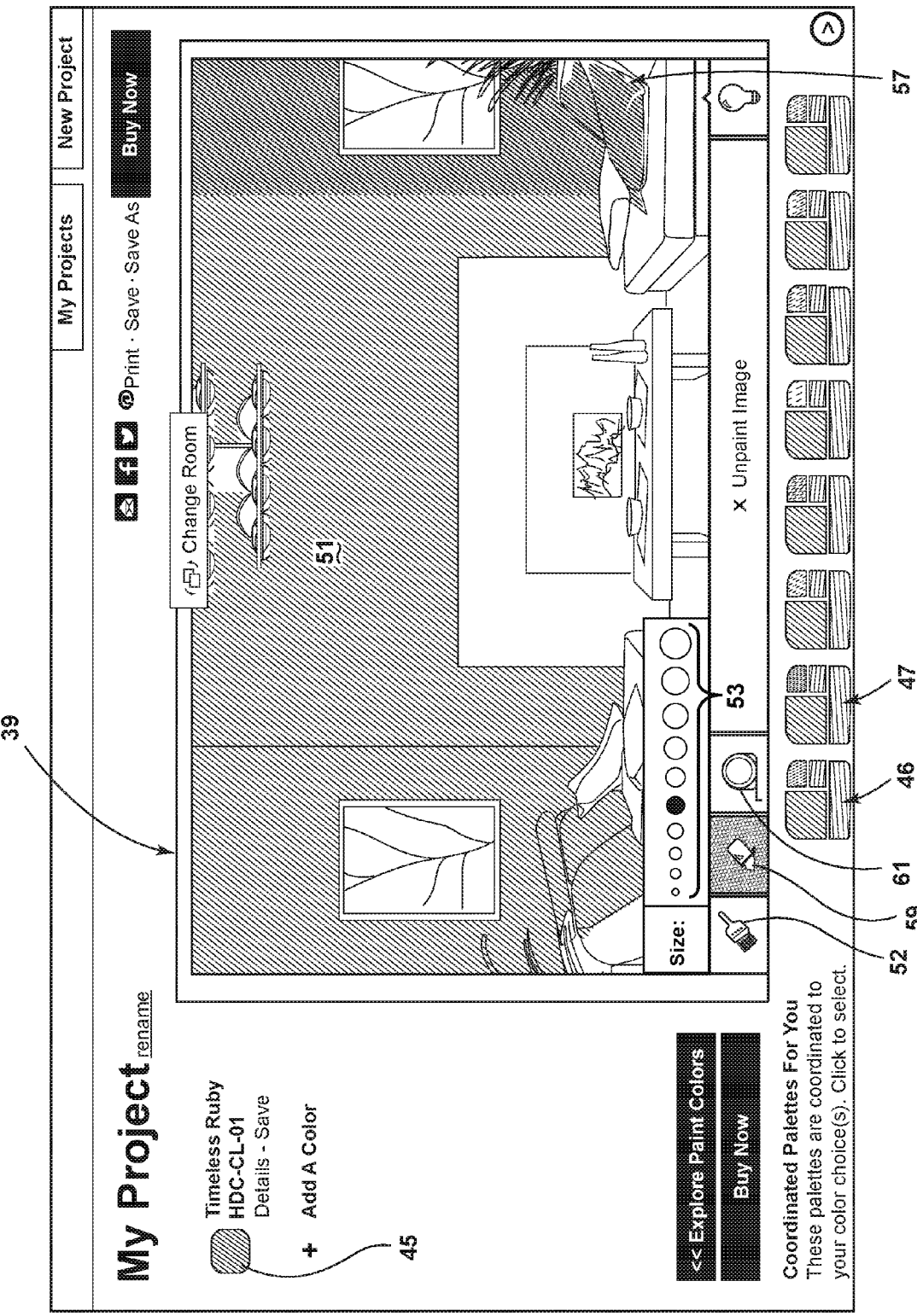
FIG. 18 is a screen display illustrating use of an eraser tool.
Figure 19:
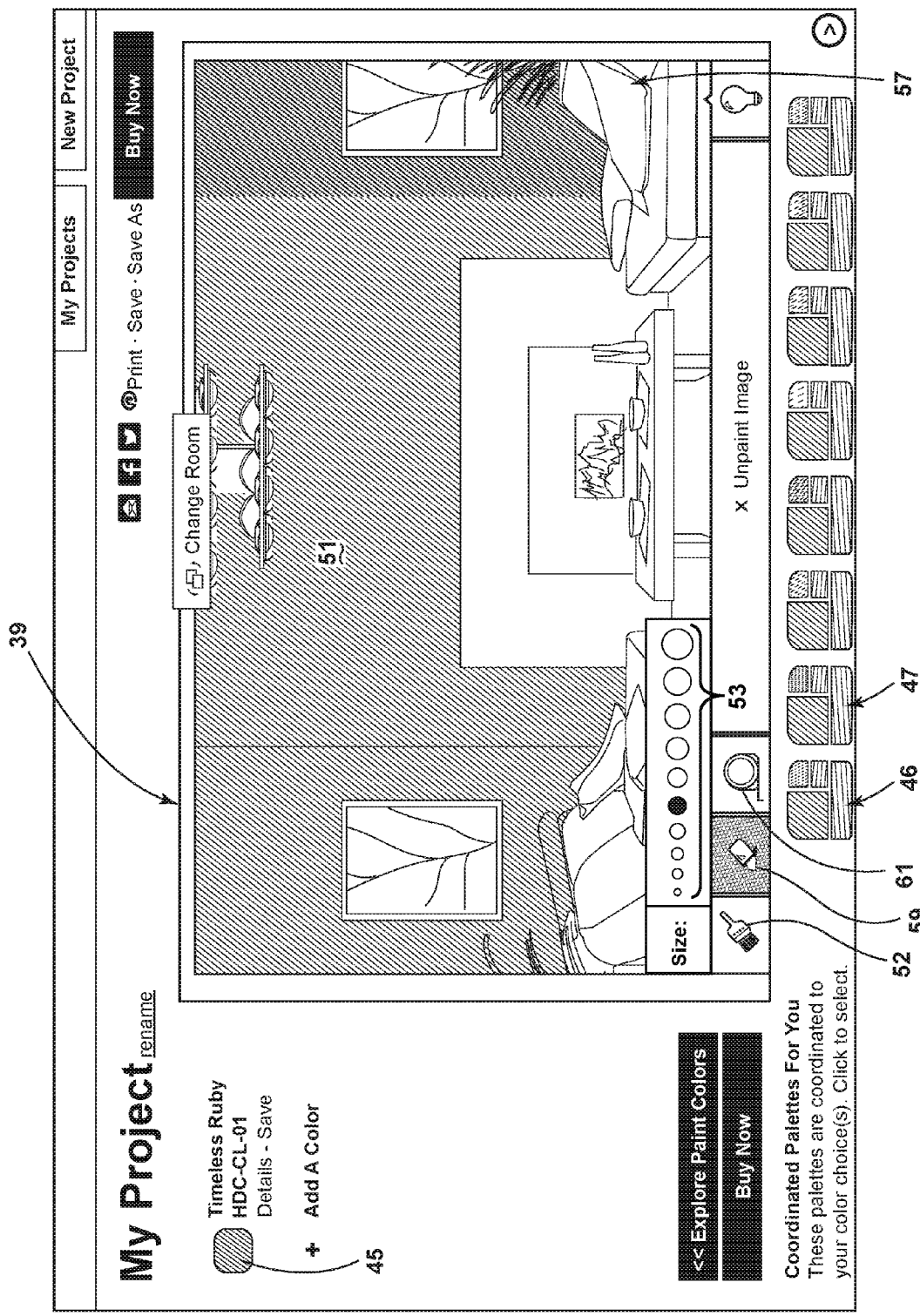
FIG. 19 is another screen display illustrating use of an eraser tool.

With respect to any areas that were not covered by using the paint bucket tool, the user can select the paintbrush tool 52, as illustrated in FIG. 16. The user can change the area size that the paint brush 52 will cover by selecting from one of the highlighted circles or "brush sizes" 53. After selecting the desired brush size, the user can paint the areas, e.g. 60, 62 of FIG. 16, that were missed by the paint bucket tool to give a more completed appearance as shown in FIG. 17. If the paint bled into an undesired area, e.g. the pillow 57 of FIGS. 17 and 18, the user can click on the eraser icon 59 and select an eraser size and, for example, click on the undesired area to remove the paint from the undesired area, to achieve the result shown in FIG. 19.

Figure 20:
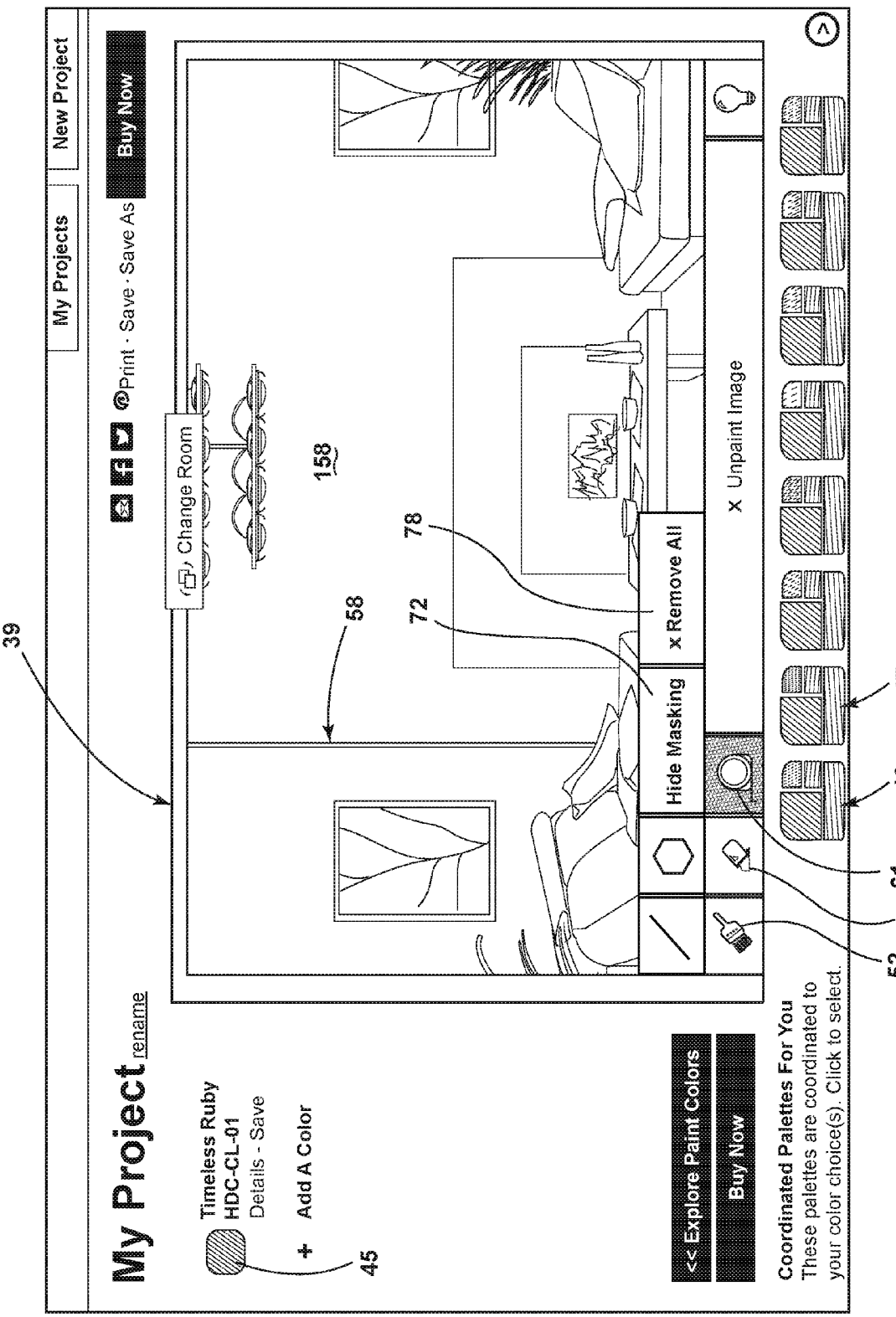
FIG. 20 is a screen display illustrating use of a first masking tool.
Figure 21:
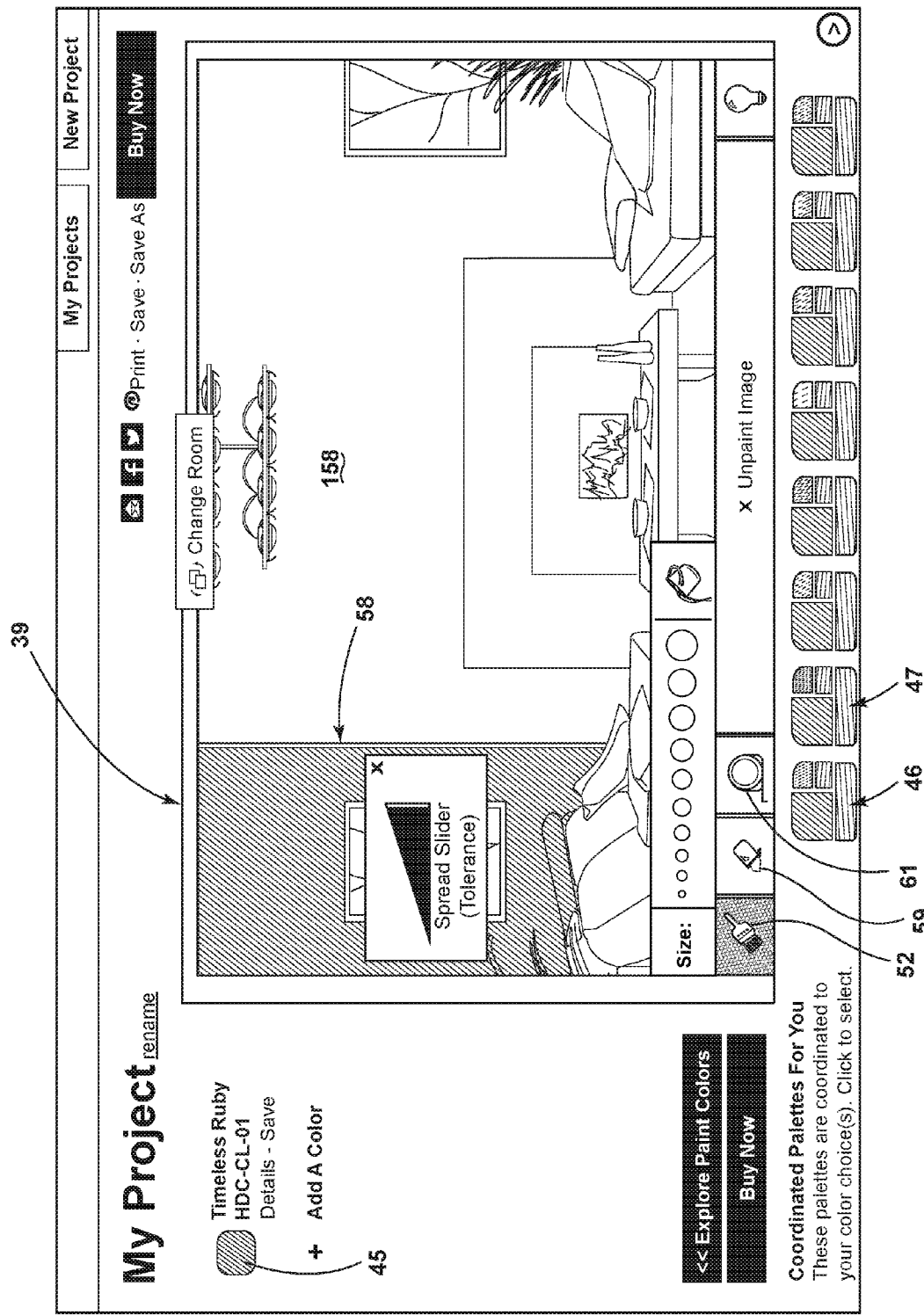
FIG. 21 is another screen display illustrating use of a first masking tool.

If the user is having an issue with the paint bleeding into undesired areas and would like to section off an area, the user can click the masking tool 161, FIG. 20. There are two types of masking tools: One is a line tool that allows a user to block off an area with a straight line 58 (FIG. 20) and then paint, e.g. with the paint brush 52, without concern that the paint will bleed into the area 158 that the user masked off, see FIG. 21.

Figure 22:
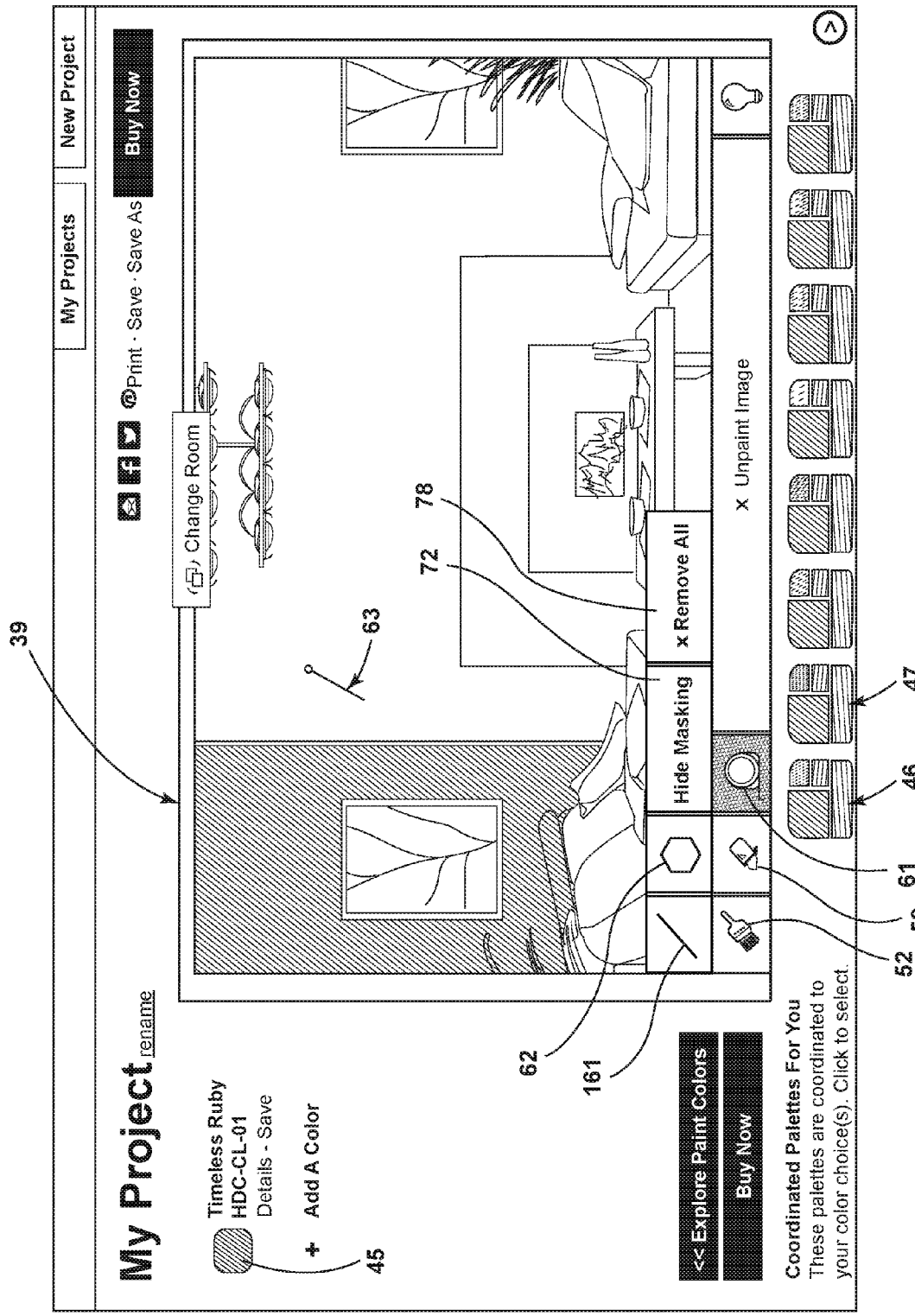
FIG. 22 is a screen display illustrating use of a second "polygon" masking tool.
Figure 23:
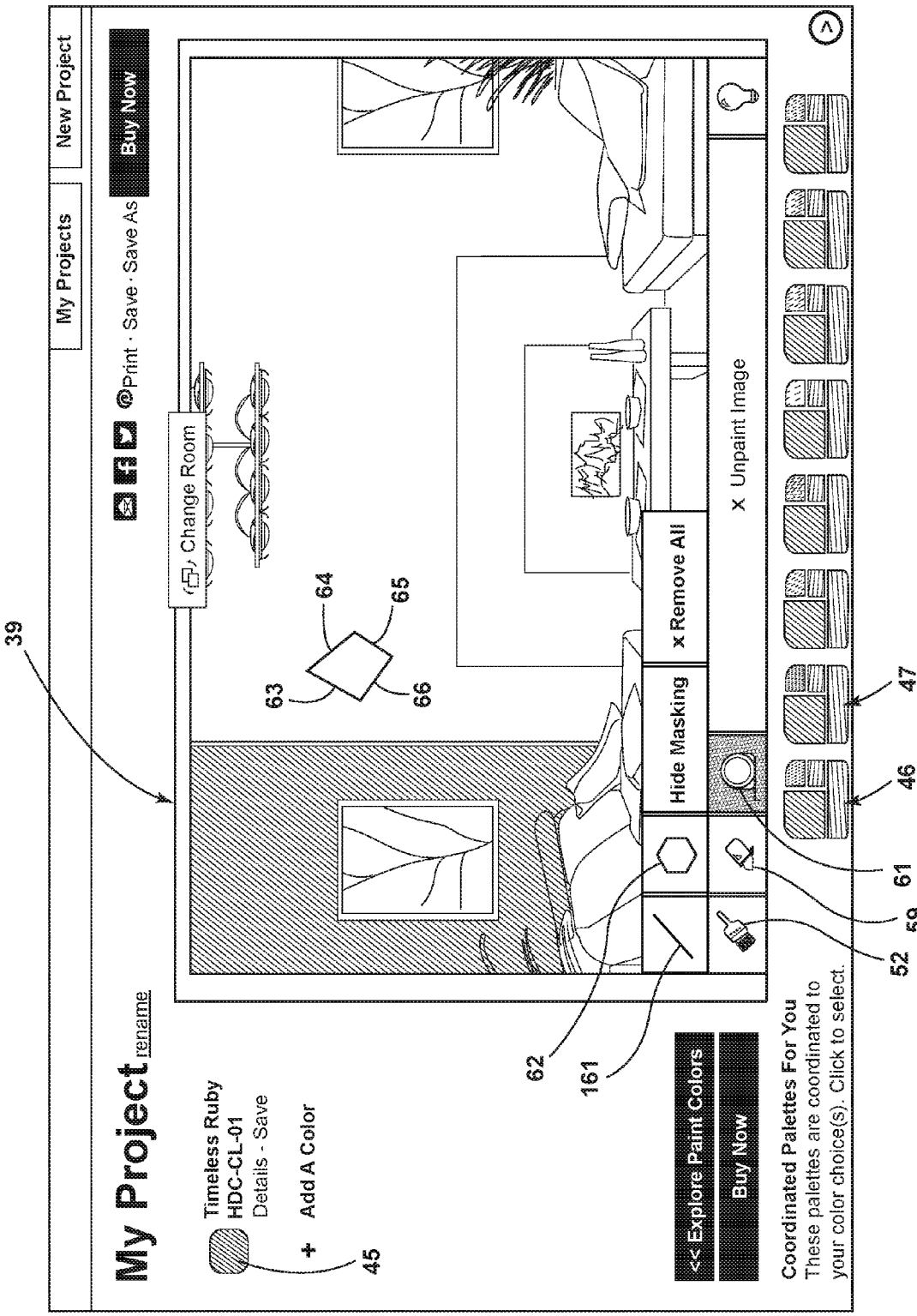
FIG. 23 is another screen display illustrating use of a second "polygon" masking tool.

The other masking tool is a polygon tool 62 as shown in FIGS. 22 and 23, which allows users to mask off areas that the straight line tool 61 is not able to accurately mask off. The polygon tool 62 draws a new line, e.g. 63 (FIG. 22), 64, 65, 66 (FIG. 23) every time the user clicks and moves the mouse. The polygon tool 62 will stop making new lines when the user connects the last desired line 66 with the point where the initial click was made. In one embodiment, this connection point may appear as a small circle on the original line 63.

Figure 24:
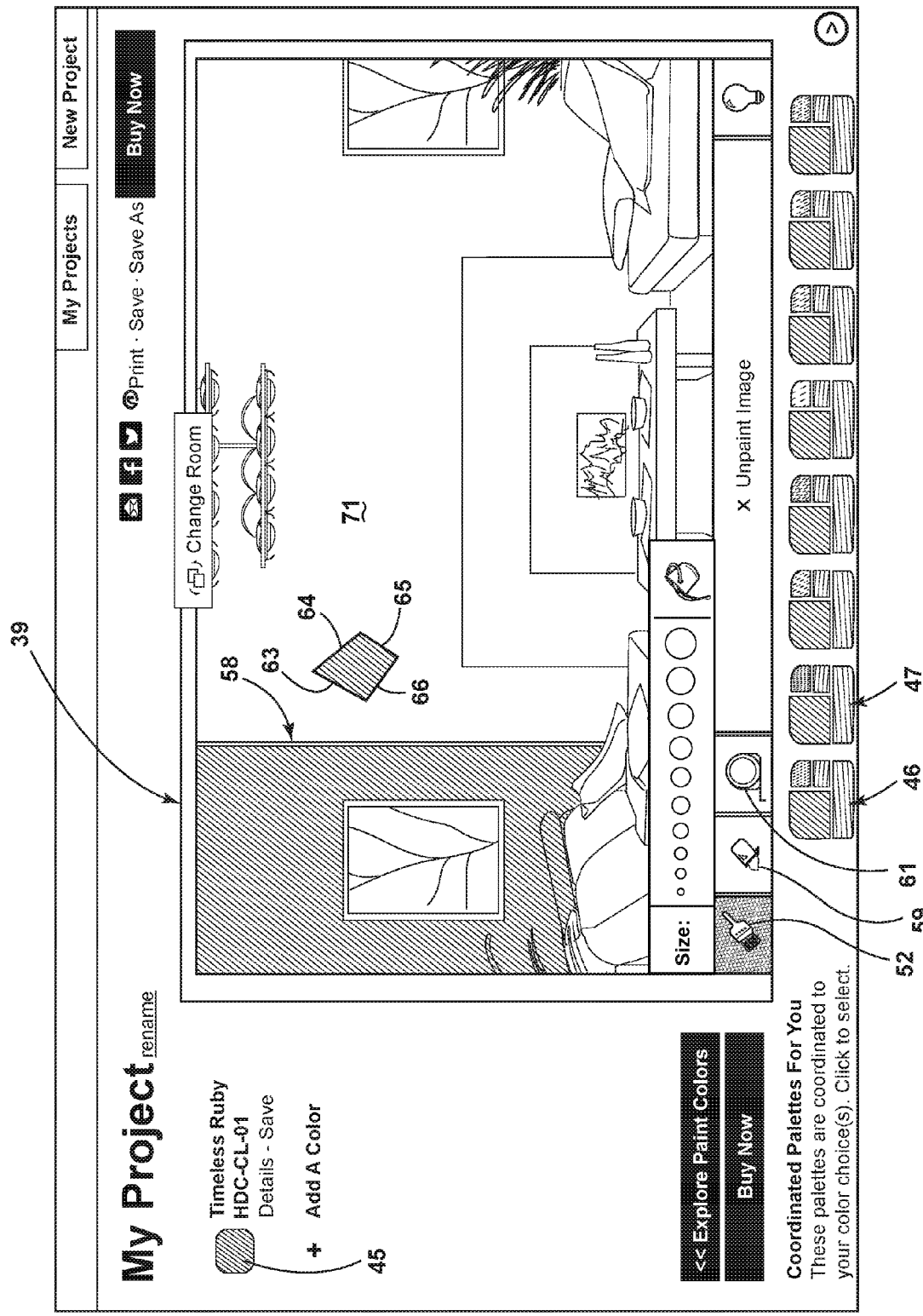
FIG. 24 is another screen display illustrating use of a second "polygon" masking tool.
Figure 25:
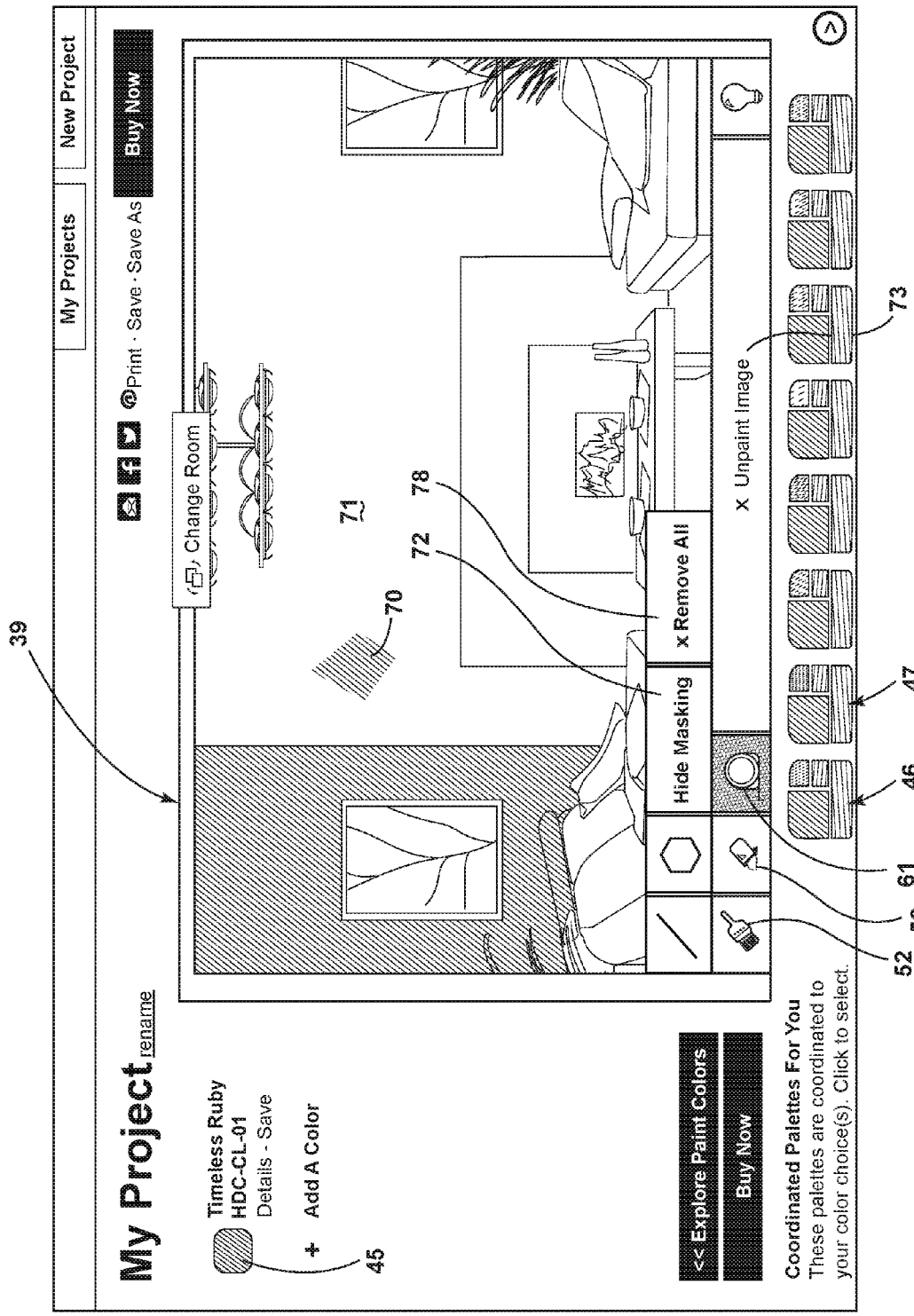
FIG. 25 is another screen display illustrating use of a second "polygon" masking tool.
Figure 26:
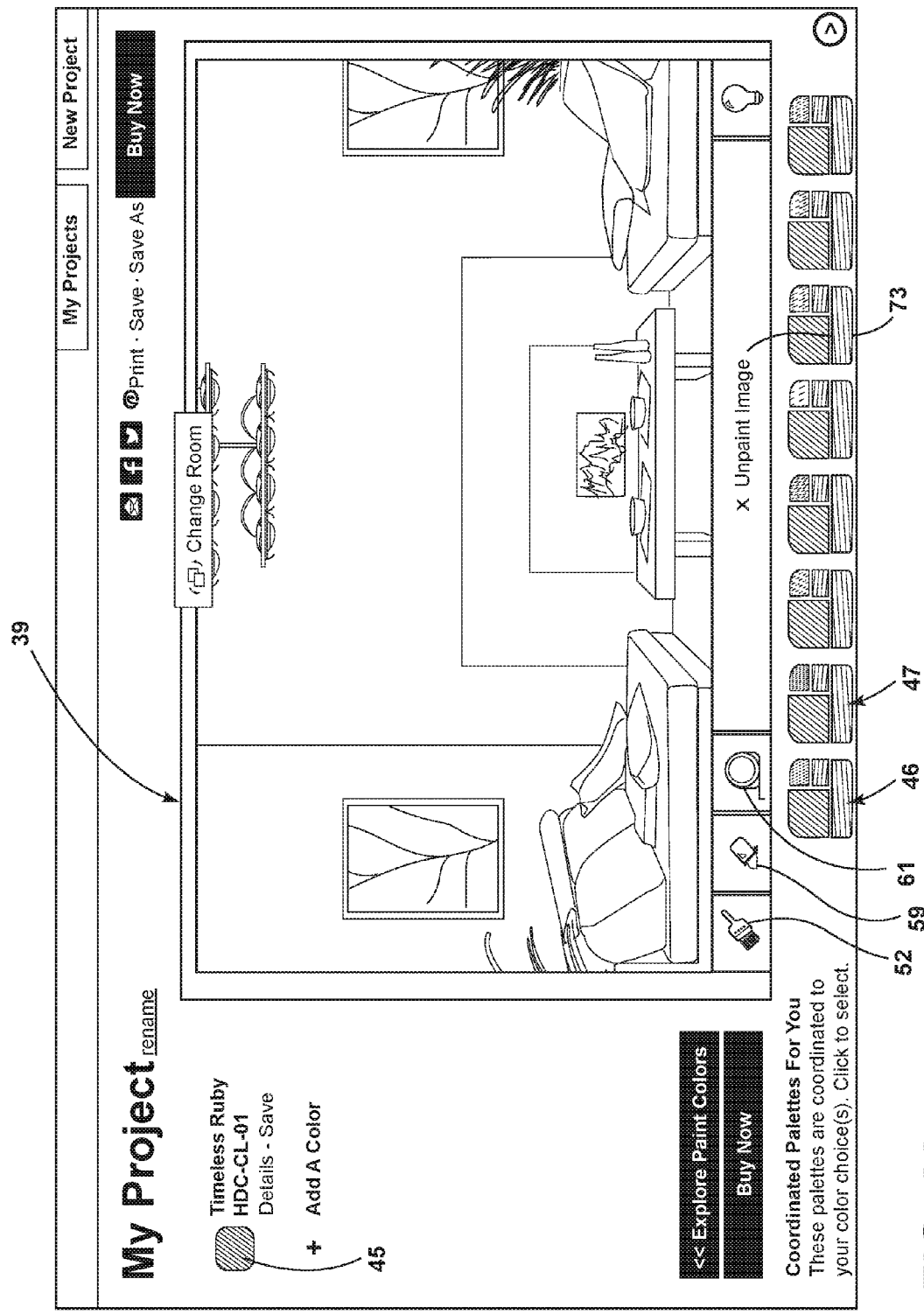
FIG. 26 is a screen display is a screen display illustrating return to the original unpainted image.

The user can then add color 70 to the area outside or inside the polygon as illustrated in FIG. 24. The user can click a "Hide Masking" icon 72, FIG. 25, to hide the polygonal mask to see what the image 70 looks like. Even though the polygonal mask is hidden, it still blocks paint from bleeding into undesired areas, e.g. 71. Or the user can click a "Remove All" icon 78 to completely remove a mask. In one embodiment, removing a mask removes the barrier that was created by the mask, and any additional paint added can now cross over into the previously masked area. To start from the beginning with the same uploaded image, the user may click an Unpaint Image icon or link 73, which returns the unpainted image with which the user started as shown in FIG. 26.

Figure 27:
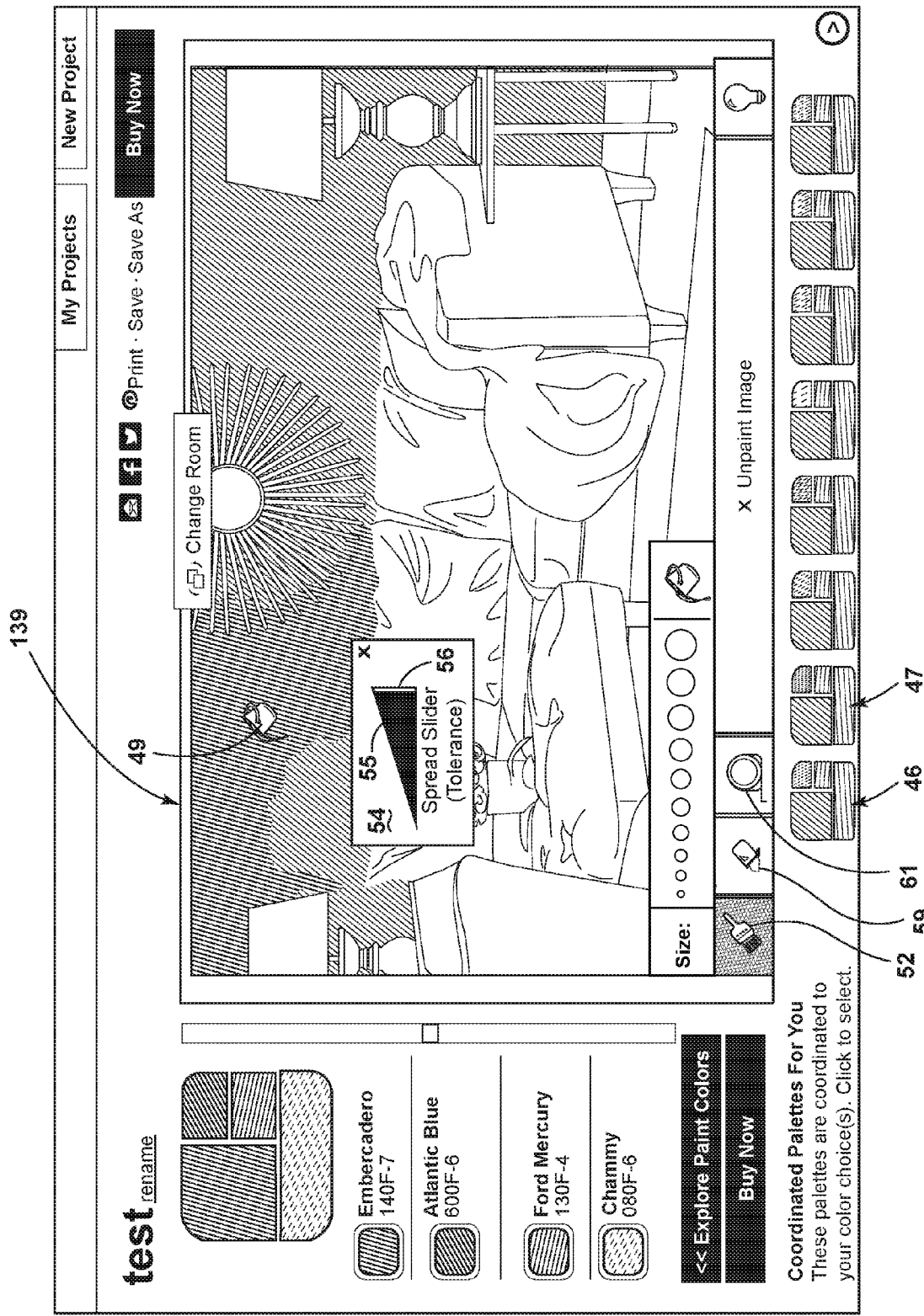
FIG. 27 is a screen display further illustrating the paint bucket tool.
Figure 28:
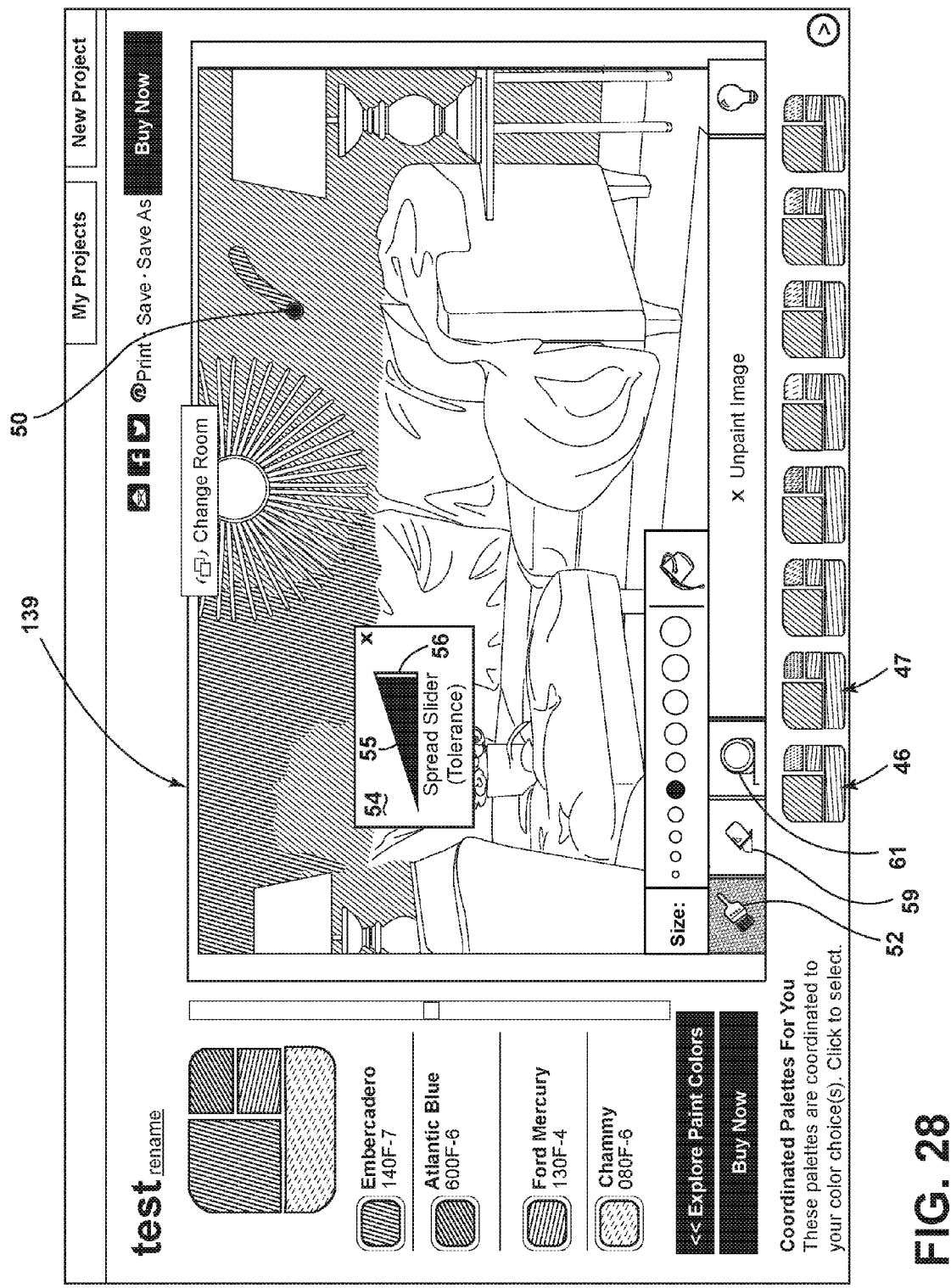
FIG. 28 is a screen display further illustrating the paint brush tool.

As discussed above, the front end screen display presented to the user includes a "bucket" tool, a "paint brush" tool 52 and "masking" tools 61, 62. A size selection tool 53 is provided to enable selection of different sized "brushes" for the paint brush tool 52. A tolerance slider 54 is also provided to select among various tolerances, which causes a greater or lesser area to be painted. In one embodiment, the bucket tool may be represented by a mouse-moveable bucket icon 49 on a room screen display as shown in FIG. 27, and the brush tool may be represented by a moveable circle 50 whose radius corresponds to the brush size selected as shown in FIG. 28.

As may be appreciated, various illustrative embodiments of an automated method, apparatus, or non-transitory computer readable medium or media for enabling a user to paint an image uploaded for display on a computer controlled display device may comprise any one or more of a paint brush tool, an eraser tool, first and/or second masking tools or a tolerance slider tool as described above.

One aspect of the illustrative embodiment involves preprocessing the uploaded image, e.g. 39, to determine in advance those areas which should be painted the same color, and caching or otherwise storing the results for subsequent use during user painting operations employing the tools described above. According to illustrative embodiments, very different image processing techniques are combined to better define such areas including a novel combination of the Canny and Sobel edge detection algorithms. Use of the Sobel algorithm enables creating a tolerance slider to assist in defining, for example, wall edges so that there is no color bleed-through into undesired areas. According to the illustrative embodiment, the Canny algorithm is employed to straighten edges which the Sobel algorithm is unable to straighten and fill in gaps left by the Canny edge detection. The overall result is a more accurate color rendering of a room as painted by the user.

According to one illustrative embodiment, processing steps are implemented to preserve relative intensity (shadowing) of the original image and apply it to the newly painted image, providing a much more realistic looking rendering. Another novel aspect of the illustrative system is that the image processing application runs on the client side, without reliance on a server, which results in much faster and more responsive processing. All of the relatively intensive calculations described below may be performed by an application written using, for example, Javascript, a relatively simple browser language.

Paint Your Place Application Preprocessing

Figure 29:
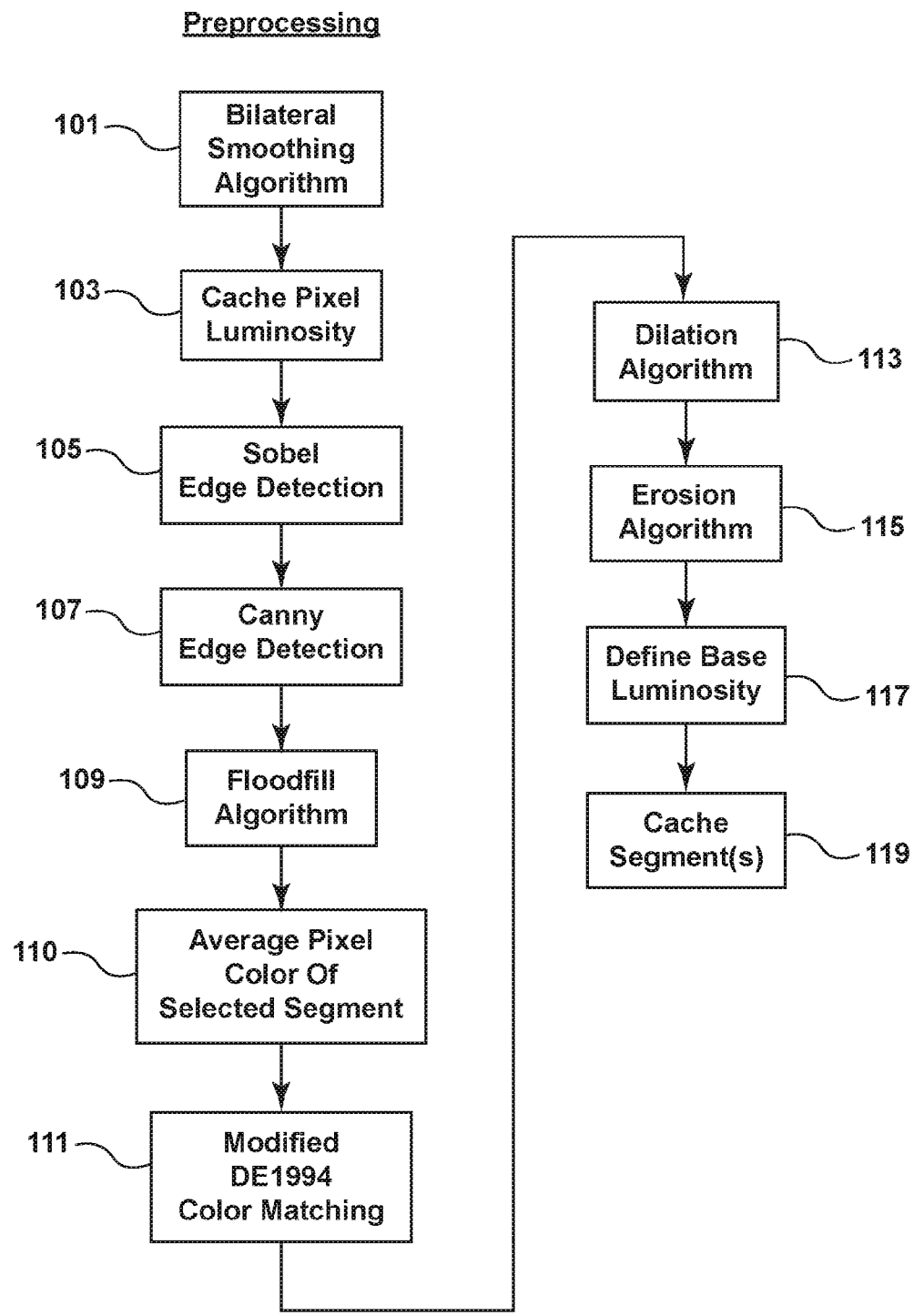
FIG. 29 is a flowchart illustrative of preprocessing of an image according to an illustrative embodiment.

Preprocessing to determine in advance which areas of an uploaded image should be painted the same color is illustrated by the flow diagram of FIG. 29. When the image is first uploaded, a bilateral smoothing algorithm is run, step 101, in order to remove noise from flat surfaces while retaining the integrity of the edges and color differences. Next, a snapshot is taken of every pixel's luminosity, placing the snapshot in a cache or other memory, step 103. Then, Sobel and Canny edge detection algorithms are run against the image, steps 105, 107. The results of running the Canny algorithm are stored separately from the results of running the Sobel algorithm on two separate canvases. As discussed below, the Canny data is used only for edge correction and straightening.

Figure 31:
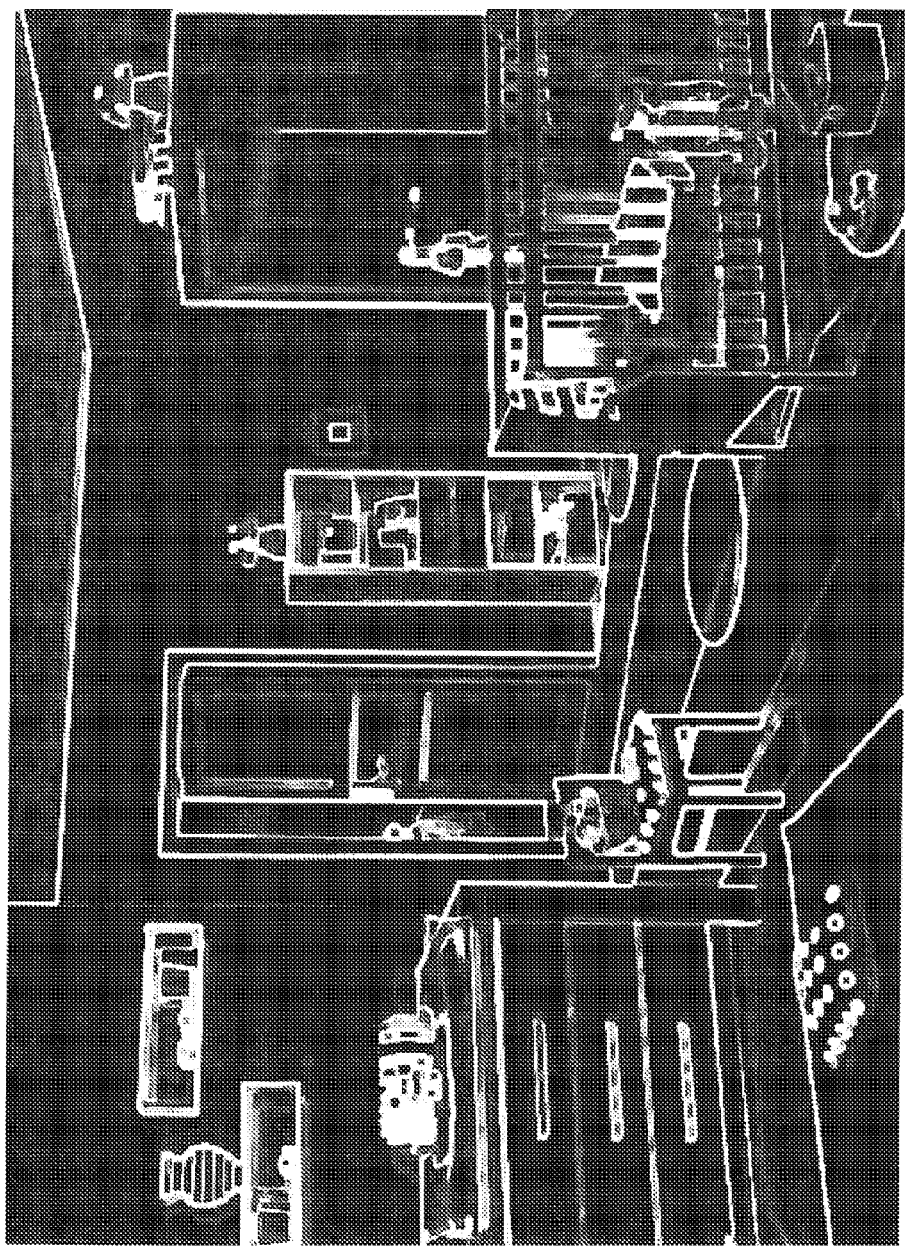
FIG. 31 shows the image of FIG. 28 after application of a Sobel algorithm after dilation and erosion, according to an illustrative embodiment.

Once the edge detection algorithms are run, the application iterates over the image, executing a floodfill algorithm on the Sobel data in step 109 to perform segmentation of the image into areas or "segments" having the same color. The floodfill algorithm is modified to account for the natural gradient of the Sobel algorithm, allowing the definition of a tolerance for the definition of image edges. In particular, a standard floodfill algorithm only checks to see if pixels are identical. According to the illustrative embodiment, rather than executing the floodfill algorithm on the image, it is executed on the Sobel data to ignore color differences. As illustrated in FIG. 31, the Sobel data is a canvas filled with black, and walls or edges in the image are defined by white, which ranges in strength from 0 to 255. The weak edges are defined by a lower white value, and "tolerance" is the value of white which the process ignores. For example, a zero tolerance ignores no edges, while a "30" tolerance ignores edges that are "30" or below. In one embodiment, the slider 54 (FIG. 14) is a one to one match with the tolerance variable.

Figure 32:
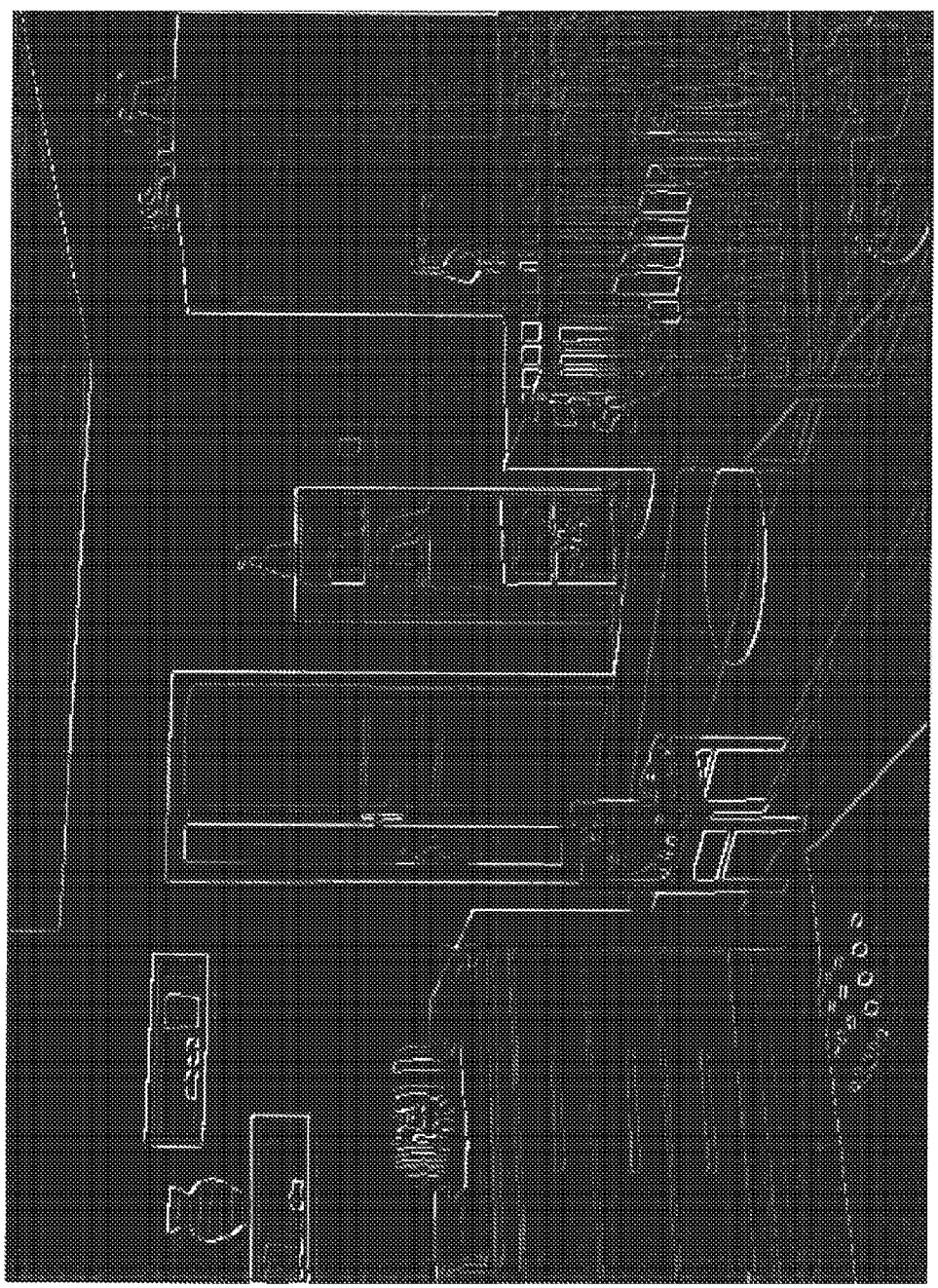
FIG. 32 illustrates results of applying a Canny algorithm to the image of FIG. 28 according to an illustrative embodiment.
Figure 33:
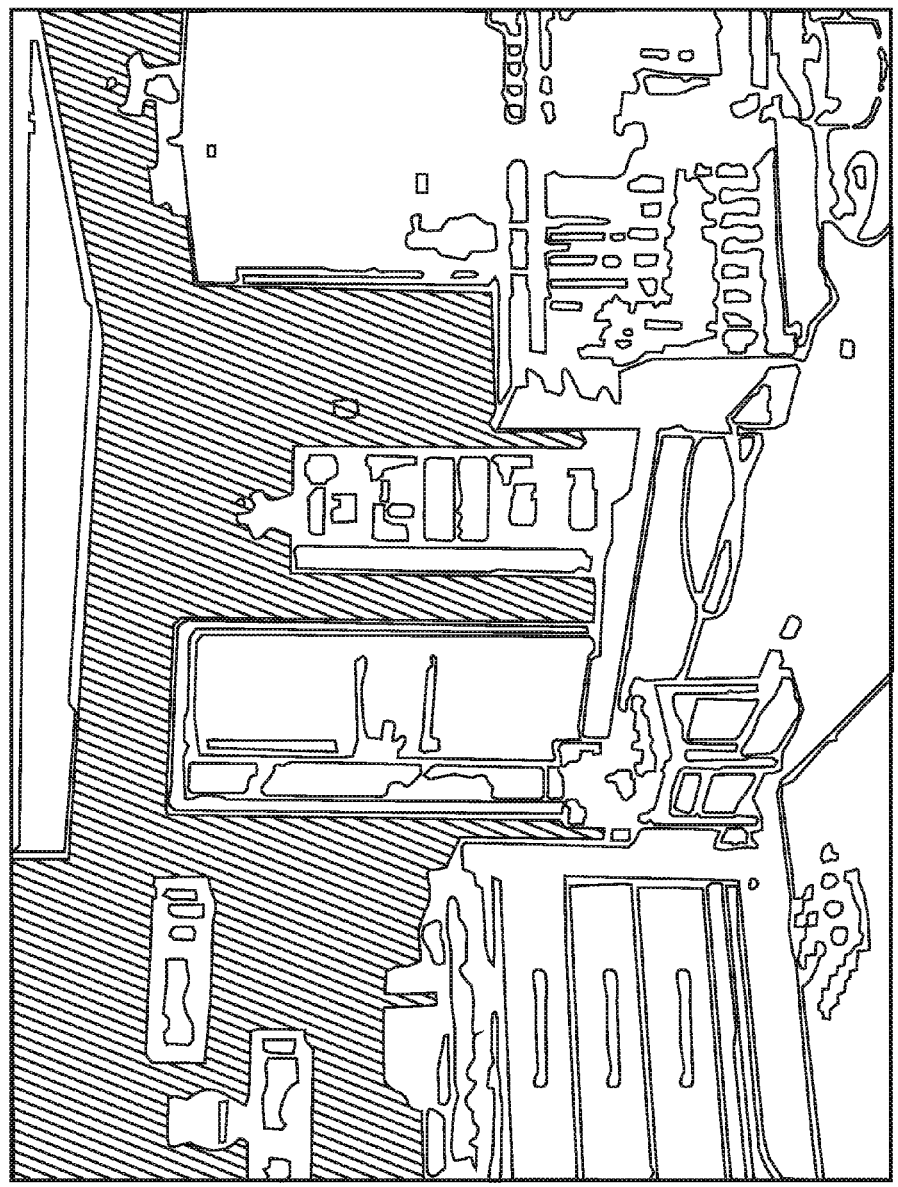
FIG. 33 illustrates segmentation of the image of FIG. 28 according to an illustrative embodiment.

In defining the area of segments to be painted the same color, the Canny edge detection is used to define straight lines, and, if an edge of a segment determined by application of the floodfill algorithm and the Sobel algorithm is close to a Canny edge, the paint color assignment to that segment is pulled to that edge to give sharp instead of flat edges as illustrated in FIG. 32. The particular function applied to do this is NearbyPixel(colorData, r, g, b, tolerance, x, y, cannyData) {//implement canny edge detection and have this also account for canny edges to straighten out the edges.} and is set forth as follows:

```
var maxX = x + tolerance;
if (maxX > W) maxX = W - 1;
var minX = x - tolerance;
if (minX < 0) minX = 0;
var maxY = y + tolerance;
if (maxY > H) maxY = H - 1;
var minY = y - tolerance;
if (minY < 0) minY = 0;
var isNearby = false;
var curi = ((y * (W * 4)) + (x * 4));
var actuali = ((y * (W * 4)) + (x * 4));
for (var curX = minX; curX <= maxX; curX++) {
  for (var curY = minY; curY <= maxY; curY++) {
    var i = ((curY * (W * 4)) + (curX * 4));
    if ((colorData[i] == r && colorData[i + 1] == g && colorData[i + 2] == b) ||
```

```
(cannyData[i] > 125)) {
    if (curX < maxX && curY < maxY && cannyData[curi] < 125) {
    if (cannyData[i] < 125) return 2;
    else return 1;
        }
            return true;
        }
    }
}
return false; }
```

"Tolerance" as referenced in the above "Nearby Pixel" function source code is defined as 6 pixels from the current pixel being checked. The function checks to see if there is a Canny line within 6 pixels of the current pixel and if so, determines that that pixel is "ok" to be painted. If a line is a weak Canny line, the process does not continue; if it is a strong Canny line, the process continues checking further pixels. In one illustrative embodiment, a strong Canny line is defined as above 50% white.

Once an area is identified for segmentation, the pixel color of the area is averaged over the area as a whole in step 110 of FIG. 29. Next, this average pixel color of the area is iterated through previously found segmentations in step 111 to determine whether it has the same or similar average pixel color as previously found segments. If it does, the area is associated with the previously found color.

In one embodiment, if a user has already painted the image, the process checks against the previous area that was painted, giving that color weight as a means of error correction. A typical user is likely to click a similar color multiple times, so the process accounts for that behavior so that the areas are not blotchy. For example, a user might paint a wall, but a heavily lighted area might not be picked up, so when the user clicks that area, the process uses the association with the wall the user just painted to ensure that both areas are working off of the same constants so that the heavily lighted area isn't treated differently.

The color matching functionality for the part of the code that assigns pixel color to segments in step 111 employs a modified DE1994 algorithm which deprioritizes luminosity as a check and which also factors in the size of the found areas (segments) by weighting by size, since, for example, a larger wall is most likely to be a main color of the image as a whole. The modified DE1994 algorithm limits the effect that luminosity has on the deltaE and is set forth in the following source code:

```
ColorUtilities.colorCompareDE1994=function(l1,a1,b1,l2,a2,b2){
    var c1=Math.sqrt(a1*a1+b1*b1);
    var c2=Math.sqrt(a2*a2+b2*b2);
    var dc=c1-c2;
    var dl=l1-l2;
    var da=a1-a2;
    var db=b1-b2;
    var dh=Math.sqrt((da*da)+(db*db)-(dc*dc));
    var first=dl / 2;
    var second=dc/(1+0.045*c1);
    var third=dh/(1+0.015*c1);
    return(Math.sqrt(first*first+second*second+third*third));
};
```

Figure 30:
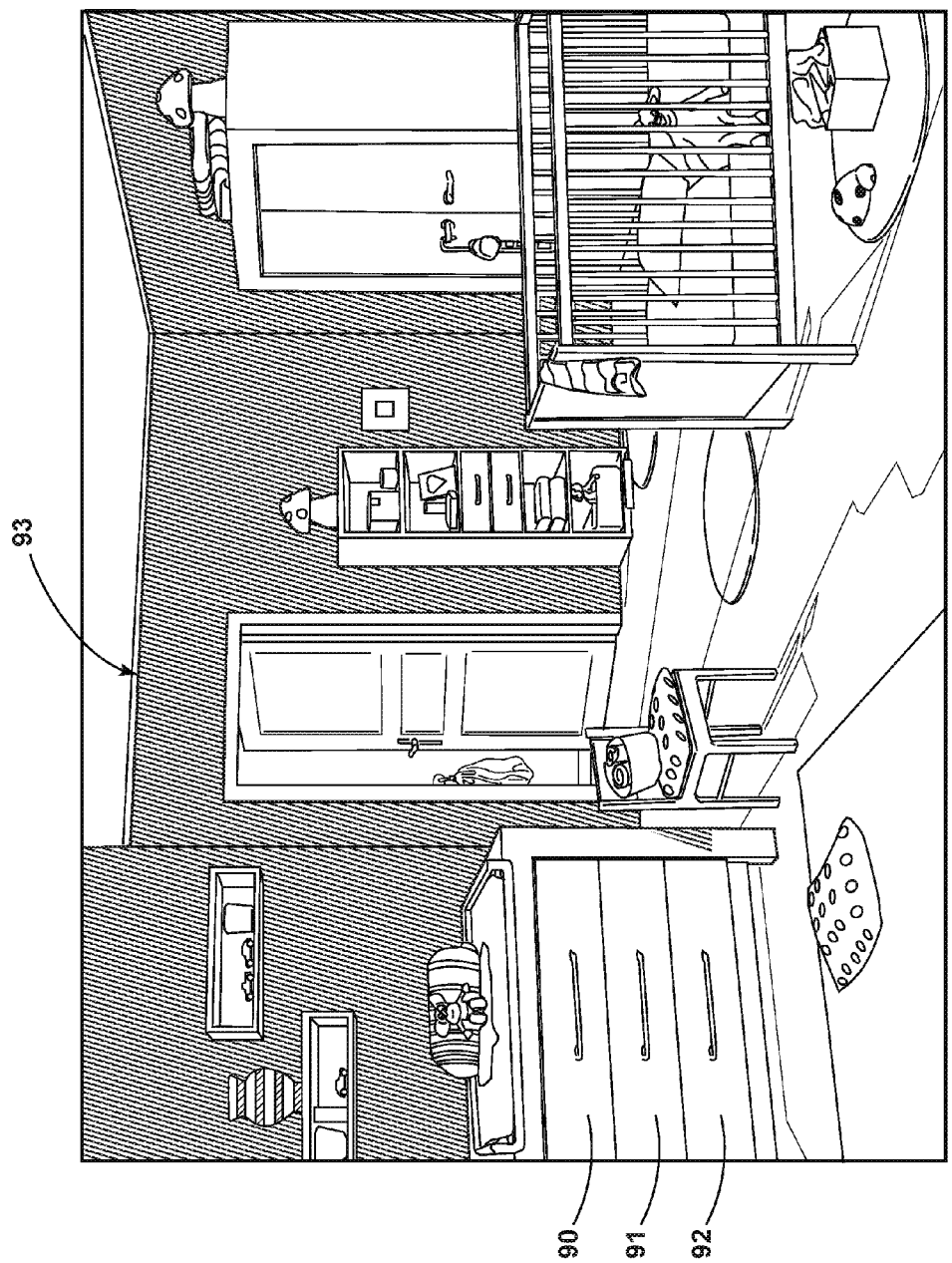
FIG. 30 presents an illustrative uploaded image.

To give an overall view of the pre-processing functions, each "segment" is an area fully enclosed by Sobel lines. For example using the Sobel data from processing the image of FIG. 30, shown in FIG. 31, each dresser drawer 90, 91, 92 is its own segment with its own color. The process checks against the average color for each drawer 90, 91, 92 and since they are similar in color, the process attributes the same color to all of the drawers 90, 91, 92. Those segments 90, 91, 92 are averaged together to decide the common color for each drawer. Since the drawers are a smaller segment as a whole, the process accords them a lower weight. The wall 93 however is a large segment and is of a single color (e.g. blue) as indicated by the cross-hatching, so that the left and right hand side have a higher weight in application of the deltaE algorithm, such that the range to accept another blue area as a similar color is higher.

Once this color matching procedure is complete, the segment under analysis is run through a dilation and then an erosion algorithm, steps 113, 115, to close gaps and stiffen edges. All associated segments are then averaged out in step 117 to define a base luminosity for the same color across multiple segments:

$$\frac{ABL1 + ABL2 + ABL3}{3}$$

In step 119, the segment is then cached with its overall average color for future calculations.

User Painting of the Preprocessed Image

Figure 34:
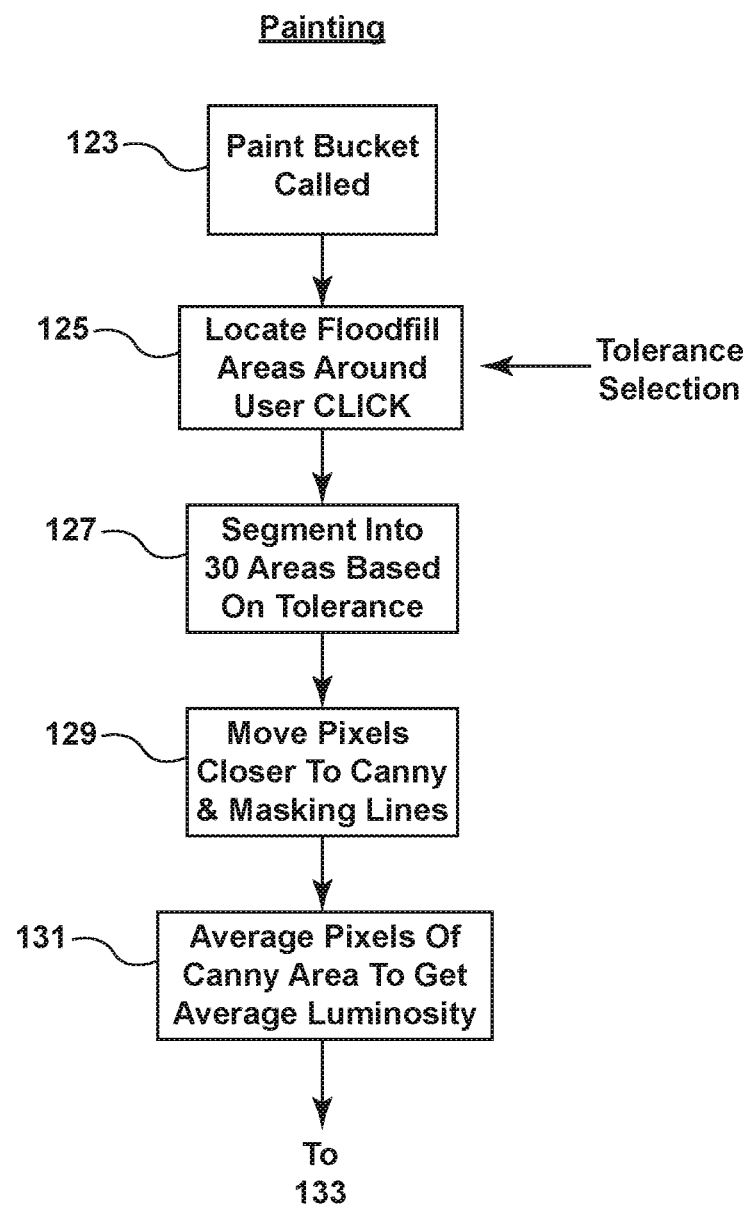
FIG. 34 is a first portion of a flow diagram illustrating painting of an image according to an illustrative embodiment.
Figure 35:
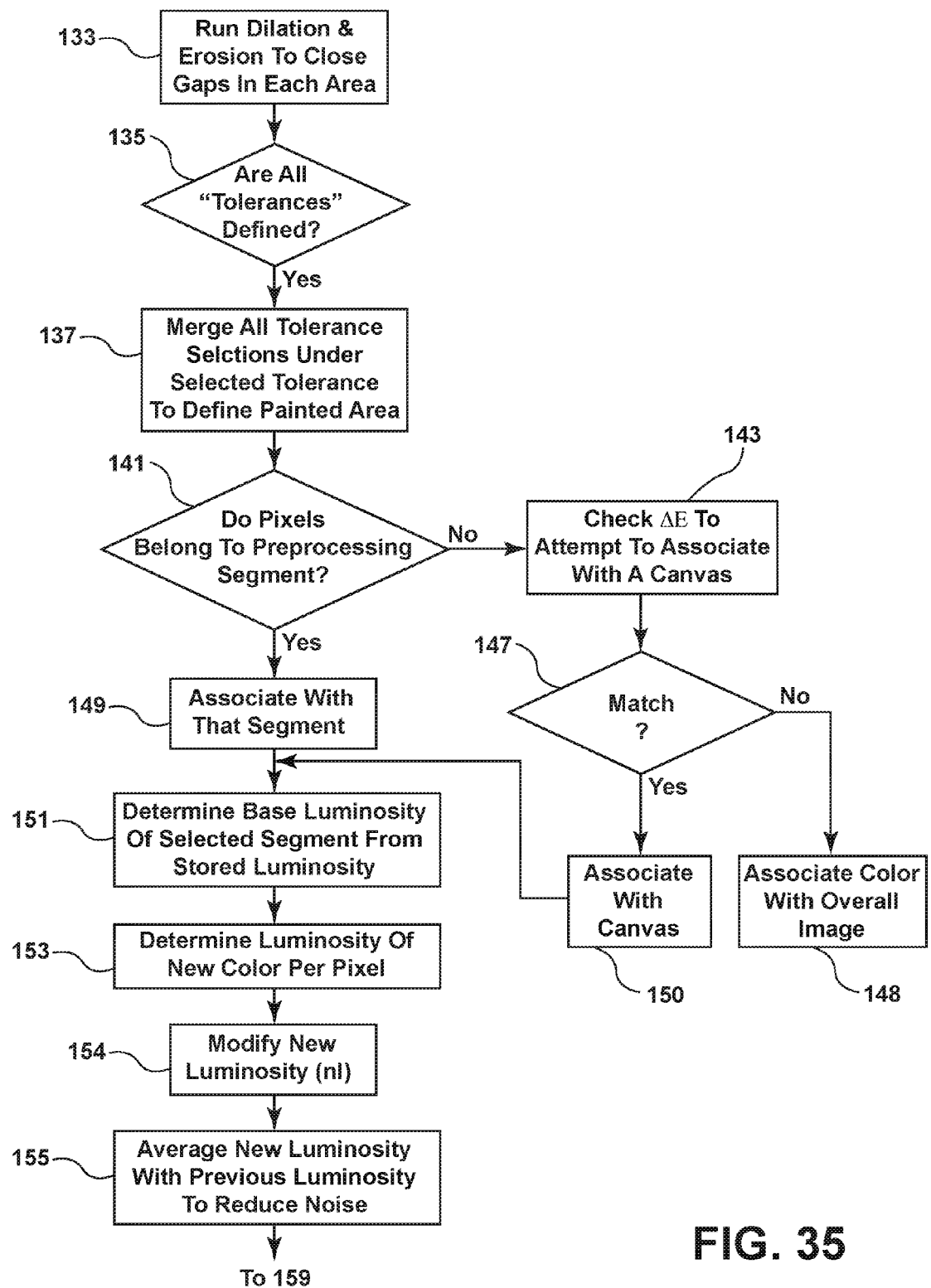
FIG. 35 is a second portion of the flowchart of FIG. 34.
Figure 36:
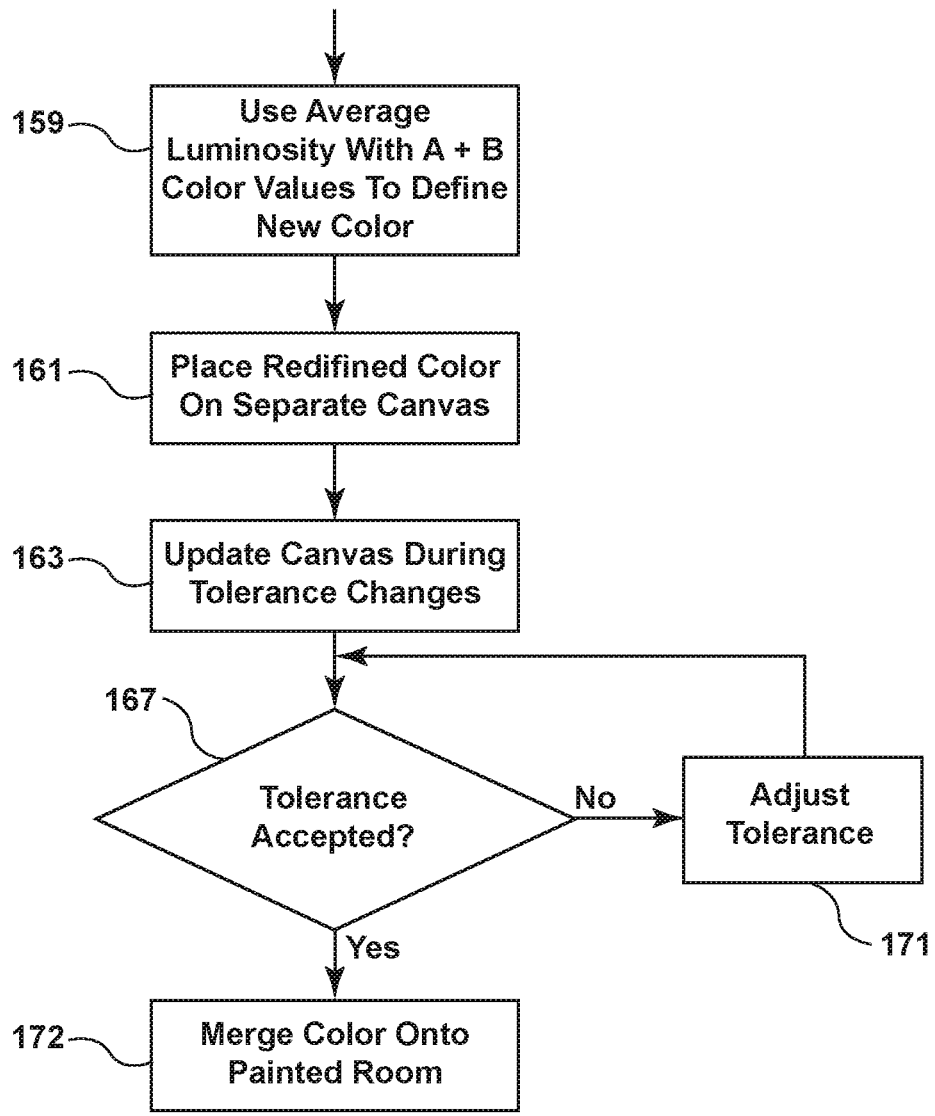
FIG. 36 is a third portion of the flowchart of FIG. 34.

The "painting" portion of the application employing a "paint bucket" is illustrated in FIGS. 34-36. When the paint bucket is called, step 123, the same floodfill algorithm used in the preprocessing operation described above is used to find the common-color areas in the area around where the user clicked, step 125. In one embodiment, thirty different floodfills, each with a different tolerance, are run against the same pixel area, step 127. The process starts with the lowest tolerance, bypassing already found pixels to optimize performance, but each of the thirty floodfills is stored in its own array to be referenced later. When the process reaches the end of a floodfill towards the edges, the "isNearbyPixel function" detailed earlier is called, which fills in the gaps between Canny edges and other already painted areas with the user selected color and instructs the floodfill algorithm to move past the Sobel tolerance, step 129.

In step 129, in addition to moving pixels to Canny lines during the procedure, pixels are also moved closer to masking lines. In one embodiment, user mask lines are treated the same as regular mask lines. When a user masks, the user's mask lines are appended to the masking layer following the same rules. While performing the floodfill algorithm to define the area of the image, the pixels selected by the floodfill algorithm are processed to determine the average luminosity of the image, step 131 (FIG. 35). With the selection defined, dilation and erosion algorithms are run, step 133, to close gaps within the selection itself.

Once all the different tolerances are defined, step 135 (FIG. 35), the application moves into painting the area determined to have been selected by the user's "bucket call" based on the tolerance set by the tolerance slider 54 (FIG. 14), and all calculations from this point are on a per-pixel basis. All the tolerance selections under the selected tolerance are merged to define the painted area, step 137. In one embodiment, a floodfill algorithm is performed for each tolerance when that tolerance is selected. The location and spread of each is cached. When a paint action is performed, the process merges from the lowest to the highest tolerance into a single paint surface and the changes applied to the pixel. Thus, adjustments to each pixel are unique. Every pixel has its LCH adjusted based on its color and the applied color and other weighting factors to maintain a natural look.

Once the painted area is defined, the application proceeds to determine whether the pixels being painted belong to a segment identified in the preprocessing, step 141. If so, that area to be painted is associated with that segment, step 149. If the area selected by the user is not part of a segment determined during preprocessing, the application attempts to associate with a canvas, steps 143, 147, 150, by checking the color difference deltaE between the base color selected by the user and all found segments found during preprocessing. There are weights to attempt to associate the color with the previously found segment if there was one and weights for the size of the canvases. In one embodiment, pixels which have already been painted are stored and if there is a sufficient delta difference, the stored luminosity from a previous paint operation is used as a means of error correction. If a match is not found at test 147, the color is associated with the overall image at step 145. Once an association has been made with the pixel, the cached luminosity value of that segment from previous paint operations or the selection as a whole is used to determine the base luminosity in step 151.

Now, using the base luminosity (bl) of the pixel, the pixels' actual luminosity (al) and the luminosity of the color selected by the user (cl) an algorithm is run to determine the luminosity that will be applied to that pixel, step 153.

The new luminosity (nl) is defined by nl=(al/bl)*cl. The new luminosity (nl) is modified, step 154, by weighting it to be closer to the original value (bl) and pulling it close to the mean color of the room. Performing these operations also allows the code to correct any radical color shifts within the same segment along with creating a color representation having a more natural feel. The bigger the difference from the base luminosity (bl) to the color luminosity (nl), the bigger the modifier. As a result, light colors on dark colors will not appear overly bright and vice versa. According to one embodiment, the modification algorithm is as follows:

(nl*(modifier))-((bl-cl)/1.5)

Once the new luminosity of each pixel is established, it is averaged with previously found luminosities, step 155, to reduce noise and create a smoother transition. With this averaged luminosity, the newly defined luminosity and the A and B values from the color selected by the user are used to define the replacement color, step 159 (FIG. 36).

Once all the pixels of the have been painted with the replacement color, the selected "rendered" color is placed on a separate canvas from the image, step 161. This canvas is updated during tolerance changes, step 163. Once a user has accepted a tolerance at test 167, the color is merged onto the painted room, step 172.

In an effort to preserve relative intensity (shadowing) of the original image in the newly painted image, the following procedure may be applied according to the following unique source code implementation of general color replacements. (Comments in the Code follow the double slashes "//")

```
//uLumins is the luminosity of the base color we defined with previous
functions
//modifier is a value we created so that light rooms painted with dark
colors are painted a bit lighter
//and dark rooms painted with light colors are a bit darker to preserve a
natural look and feel.
//toColorLCH[0] is the luminosity value of the color we intend to paint
with var modifier = uLumins − toColorLCH[0];
```

-continued

```
if (modifier < 0) {
    modifier = (100 + modifier) / 100;
} else if (modifier > 0) {
    modifier = (100 / (100 − modifier));
} else {
    modifier = 1;
}
//luminMapData is the actual luminosity value of the base image
var newLumin = ((luminMap.data[i] / uLumins) * toColorLCH[0]);
newLumin = (newLumin * (modifier)) − ((uLumins − toColorLCH[0]) /
1.5);
//luminosity has a ceiling of 100, if its above 100 we set it at 100
if (newLumin > 100) newLumin = 100;
//the following code averages the pixel against previous pixels as a means
of noise removal and error correction
if (ix != 0) {
    var leftLuminI = ((iy * (W * 4)) + ((ix − 1) * 4));
    var leftLumin =
    ColorUtilities.convertRGBToLAB(newImageData.data[leftLuminI],
newImageData.data[leftLuminI + 1], newImageData.data[leftLuminI +
2])[0];
}
if (prevLumin > 0 && iy != selectionDataBoundingRectMinY && ix !=
selectionDataBoundingRectMinX && (cachedLumins < 10 ||
Math.abs(prevLumin −
newLumin) > 5 || Math.abs(leftLumin − newLumin)) > 5) {
    if (leftLumin > 0 && ix != 0) {
        newLumin = ((prevLumin * 2) + (leftLumin * 2) + newLumin) /
        5;
    } else {
        newLumin = ((prevLumin * 4) + newLumin) / 5;
    }
}
//track the previous lumin for use on the next pixel
prevLumin = newLumin;
//new color takes the target colors A and B values and inserts our
determined luminosity
var newColor = ColorUtilities.convertLABToRGB(newLumin,
toColorLCH[1],
toColorLCH[2]);
```

If a user paints a surface which has already been painted during the session, there is no tolerance check and a floodfill is performed across all areas where the color currently appears, rendering all contiguous areas under the same painted color using the methodology described above.

"Paintbrush" works off of a similar algorithm to the paint bucket process with the additional factor that there is no overall painted area to define a base luminosity. The process seeks to determine if a pixel is on a defined segment to determine the base luminosity, if it is not, the pixel's actual luminosity is used to define the pixel. In one embodiment, after painting with the paint brush, the paint bucket logic is executed to correct the rendered color with the additional information and logic that the bucket operation has generated.

Those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. An automated method for enabling a user to paint an image uploaded to a computer display device, the automated method comprising:

employing one or more computers to perform a plurality of operations in conjunction with a computer readable medium or media and a computer controlled display apparatus, the operations comprising generating a first display on said computer controlled display apparatus the first display comprising:

a display of a room image uploaded by a user;
a display of at least one color selected by the user;
a first icon comprising a link enabling selection of a paint brush tool;
a second icon comprising a link enabling selection of an eraser tool; and
a third icon comprising a link enabling selection of a masking tool;
enabling the user to perform a paint bucket operation to apply a selected color to a first area of the uploaded image;
enabling the user to employ the paint brush tool to fill an area which was missed during application of the selected color to the first area;
enabling the user to employ the eraser tool to remove color which bled into an undesired area during application of the selected color; and
enabling the user to employ the masking tool to mask off a selected area of said room image such that color will not be applied to that selected area;
wherein selection of the paint brush tool causes a brush size selection display to be displayed on the first display, the brush size selection display configured to enable the user to select from among a plurality of different sized brushes, each of the different sized brushes enabling coverage of a different sized area and wherein the paint brush tool is represented on the first display by a moveable circle whose radius corresponds to a brush size selected on the brush size selection display.

2. The method of claim 1 further comprising generating a display of a tolerance slider tool on said first display and enabling the user to employ the slider tool to either increase or decrease the area painted.

3. The method of claim 2 wherein the display of the tolerance slider tool comprises a darkened area within a right triangle which may be pulled to the left or right to either increase or decrease the area painted.

4. The method of claim 1 wherein said masking tool enables a user to block of an area not to be painted with a straight line.

5. The method of claim 1 wherein said masking tool enables a user to generate a polygon on said first display to mask off an area within the polygon.

6. The method of claim 1 wherein said paint bucket operation comprises clicking on a selected color and then clicking on an area to which the selected color is to be applied.

7. The method of claim 1 wherein said paint bucket operation employs a mouse-moveable bucket icon.

8. The method of claim 1 wherein the first area painted is one of a wall, a ceiling or a door.

9. A non-transitory computer readable medium or media have computer readable program code embodied therein, said computer readable program code adapted to be executed by one or more computers to implement a method comprising
generating a first display on a computer controlled display apparatus, the first display comprising:
a display of a room image uploaded by a user;
a display of at least one color selected by the user;
a first icon comprising a link enabling selection of a paint brush tool;
a second icon comprising a link enabling selection of an eraser tool; and
a third icon comprising a link enabling selection of a masking tool;
enabling the user to perform a paint bucket operation to apply a selected color to a first area of the uploaded image;
enabling the user to employ the paint brush tool to fill an area which was missed during application of the selected color to the first area;
enabling the user to employ the eraser tool to remove color which bled into an undesired area during application of the selected color; and
enabling the user to employ the masking tool to mask off a selected area of said room image such that color will not be applied to that selected area;
wherein selection of the paint brush tool causes a brush size selection display to be displayed on the first display, the brush size selection display configured to enable the user to select from among a plurality of different sized brushes, each of the different sized brushes enabling coverage of a different sized area and wherein the paint brush tool is represented on the first display by a moveable circle whose radius corresponds to a brush size selected on the brush size selection display.

10. The non-transitory computer readable medium or media of claim 9, wherein the method further comprises generating a display of a tolerance slider tool on said first display and enabling the user to employ the slider tool to either increase or decrease the area painted.

11. The non-transitory computer readable medium or media of claim 10 wherein the display of the tolerance slider tool comprises a darkened area within a right triangle which may be pulled to the left or right to either increase or decrease the area painted.

12. An apparatus comprising: a display device; at least one computing device; and associated data storage memory, the display device, at least one computing device and associated data storage memory being configured to generate a display on the display device of a room image uploaded by a user and to enable the user to perform a paint bucket operation to apply a selected color to a first area of the uploaded image, the display further comprising:
a first icon comprising a link enabling selection of a paint brush tool to fill an area which was missed during application of the selected color to the first area;
a second icon comprising a link enabling selection of an eraser tool to remove color which bled into an undesired area during application of the selected color; and
a third icon comprising a link enabling selection of a masking tool to mask off an area which is not to be painted;
wherein selection of the paint brush tool causes a brush size selection display to be displayed on the display, the brush size selection display configured to enable the user to select from among a plurality of different sized brushes, each of the different sized brushes enabling coverage of a different sized area and wherein the paint brush tool is represented on the display by a moveable circle whose radius corresponds to a brush size selected on the brush size selection display.

13. The apparatus of claim 12 further comprising generating a display of a tolerance slider tool on said display and enabling the user to employ the slider tool to either increase or decrease the area painted.

14. The apparatus of claim 13 wherein the display of the tolerance slider tool comprises a darkened area within a right triangle which may be pulled to the left or right to either increase or decrease the area painted.

* * * * *